United States Patent
Pasquero et al.

(10) Patent No.: US 9,632,649 B2
(45) Date of Patent: Apr. 25, 2017

(54) METHODS AND DEVICES TO ALLOW COMMON USER INTERFACE MODE BASED ON ORIENTATION

(75) Inventors: Jerome Pasquero, Kitchener (CA); David Ryan Walker, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 240 days.

(21) Appl. No.: 13/583,301

(22) PCT Filed: Oct. 3, 2011

(86) PCT No.: PCT/CA2011/050618
§ 371 (c)(1),
(2), (4) Date: Sep. 7, 2012

(87) PCT Pub. No.: WO2013/049909
PCT Pub. Date: Apr. 11, 2013

(65) Prior Publication Data
US 2013/0111370 A1    May 2, 2013

(51) Int. Cl.
*G06F 3/00* (2006.01)
*G06F 3/048* (2013.01)
(Continued)

(52) U.S. Cl.
CPC ............ *G06F 3/0481* (2013.01); *G06F 3/048* (2013.01); *H04W 4/206* (2013.01)

(58) Field of Classification Search
CPC .... G06F 1/1632; G06F 3/04886; G06F 3/017; G06F 3/01; G06F 3/0414;
(Continued)

(56) References Cited

U.S. PATENT DOCUMENTS

| 7,532,196 B2 | 5/2009 | Hinckley |
| 7,636,794 B2 | 12/2009 | Ramos et al. |

(Continued)

FOREIGN PATENT DOCUMENTS

| WO | WO2004/075169 | 9/2004 |
| WO | 2005071530 | 8/2005 |
| WO | 2011042748 | 4/2011 |

OTHER PUBLICATIONS

Chris Davies, "Verizon Hub Launches for $199.99," Feb. 2, 2009, Slashgear.com, pp. 1-7.*

(Continued)

*Primary Examiner* — Ariel Mercado
(74) *Attorney, Agent, or Firm* — Rowand LLP

(57) ABSTRACT

A method and electronic devices to allow a common user interface mode on a first electronic device and a second electronic device are described. In one aspect, the method comprises: receiving first orientation data from an orientation sensor associated with the first electronic device; receiving, at the first electronic device, second orientation data from the second electronic device; determining, from the first orientation data and the second orientation data, if the orientation of the first electronic device and the second electronic device satisfy at least one predetermined orientation criterion; and if the orientation of the first electronic device and the second electronic device satisfy the at least one predetermined orientation criterion, allowing the first electronic device and the second electronic device to enter a common user interface mode.

13 Claims, 13 Drawing Sheets

(51) Int. Cl.
*G06F 17/00* (2006.01)
*G06F 3/0481* (2013.01)
*H04W 4/20* (2009.01)

(58) Field of Classification Search
CPC ...... G06F 2203/04803; G06K 9/00248; G06K 9/00343; G06K 9/3208
See application file for complete search history.

(56) References Cited

U.S. PATENT DOCUMENTS

| | | | |
|---|---|---|---|
| 8,537,113 B2* | 9/2013 | Weising et al. | 345/158 |
| 2006/0146765 A1* | 7/2006 | Van De Sluis et al. | 370/338 |
| 2008/0304361 A1 | 12/2008 | Peng | |
| 2011/0216002 A1 | 9/2011 | Weising et al. | |
| 2011/0239114 A1* | 9/2011 | Falkenburg | G06F 3/04883 715/702 |
| 2012/0084721 A1* | 4/2012 | Gimpl et al. | 715/800 |
| 2013/0050080 A1* | 2/2013 | Dahl | G01S 5/18 345/158 |
| 2013/0052954 A1* | 2/2013 | Avadhanam | 455/41.2 |

OTHER PUBLICATIONS

For Immediate Release, http://blog.sifteo.com/wp-content/uploads/2011/07/Sifteo-Press-Release.pdf, Jan. 5, 2011.
For Release, Siftcoi Named As Ces Innovations 2011 Design Engineering Award Honoree, http://blog.sifteo.com/wp-content/uploads/2011/07/Sifteo-CES-Innovations-Press-Release.pdf, Jan. 5, 2010.
International Search Report dated May 10, 2012.
Yanko Design, http://www.yankodesign.com/2007/08/28/two-brix-are-better-than-one/, retrieved Aug. 28, 2007.
"Siftables: Towards Sensor Network User Interfaces" http://fluid.media.mit.edu:4000/assets/_pubs/siftables.pdf , Retrieved at least as early as Jun. 7, 2011.
Epos, "Superior Input Devices", http://www.epos-ps.com/page.php?id=TECHNOLOGY—available at least as early as Jul. 11, 2011.
EPO, Extended European Search Report relating to Application No. 11873636.2, dated Apr. 14, 2015.

* cited by examiner

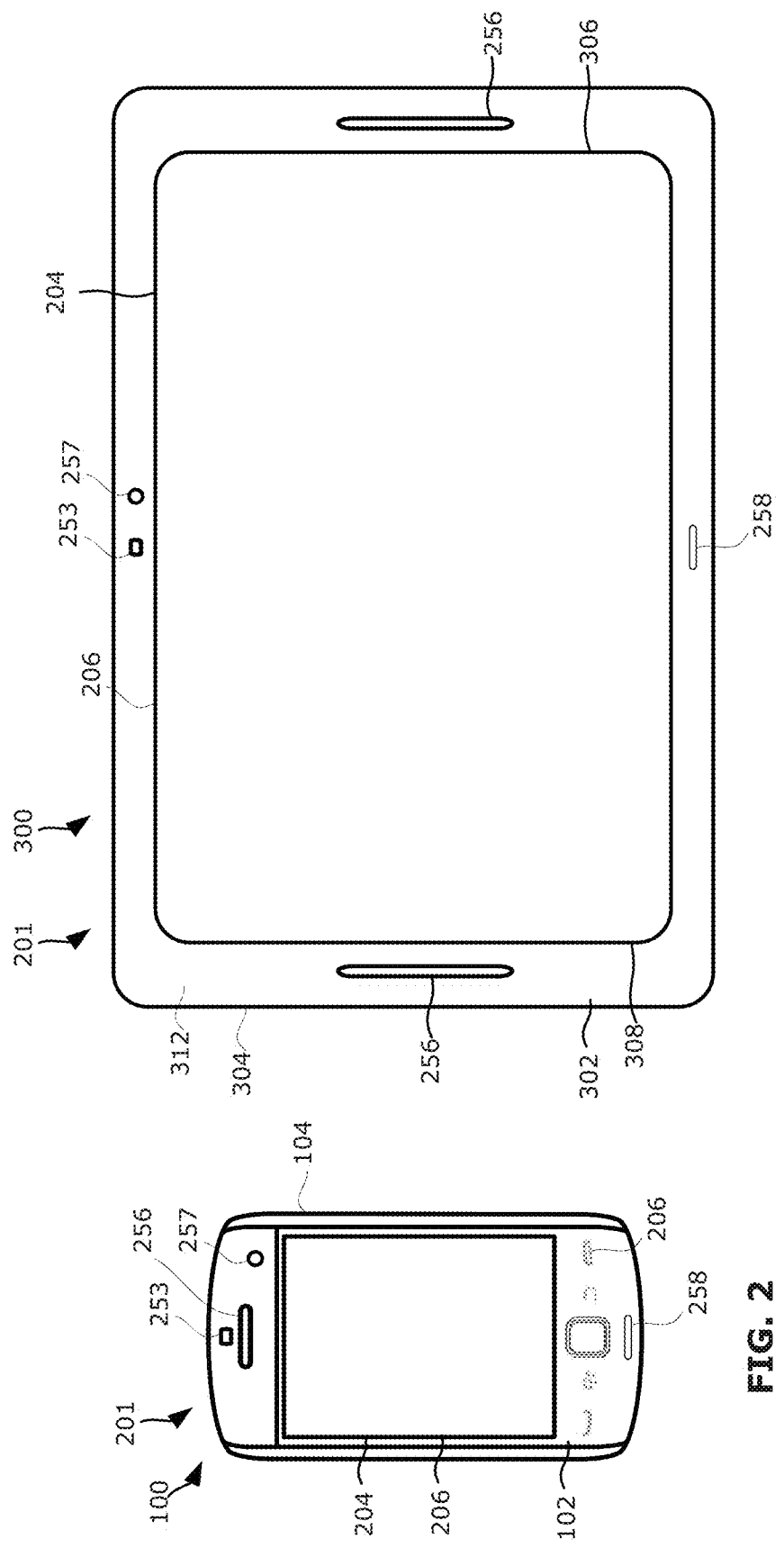

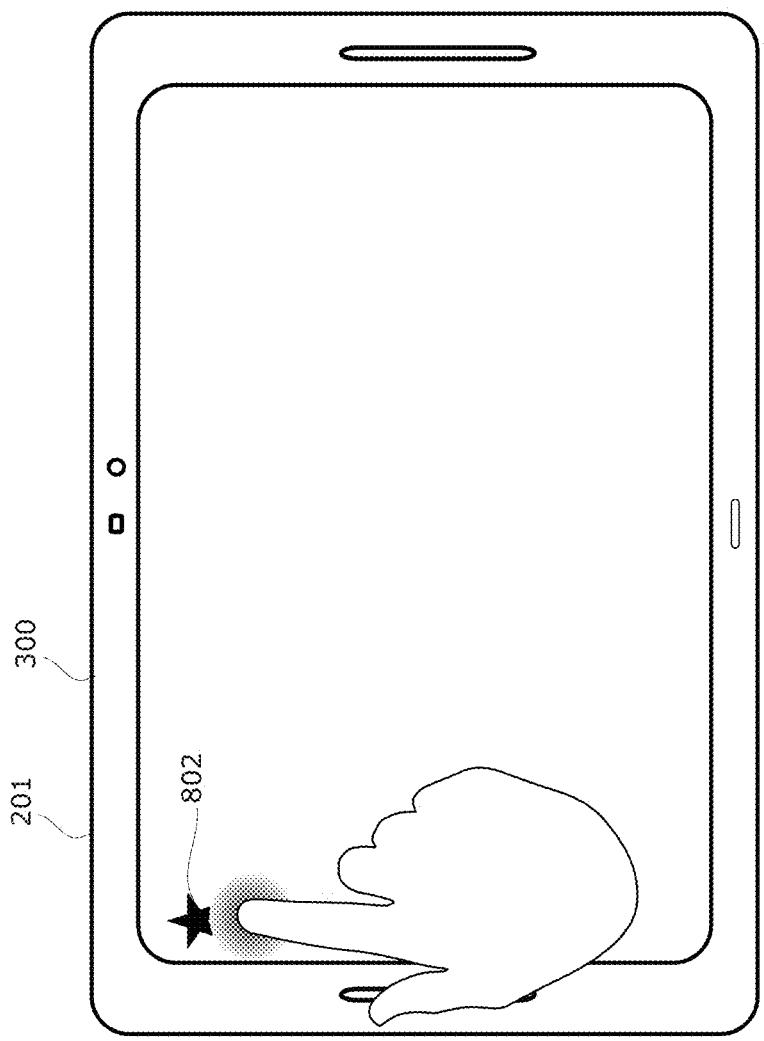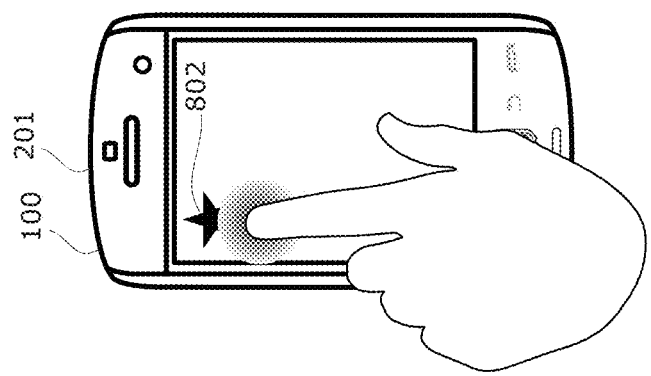
FIG. 8

METHODS AND DEVICES TO ALLOW COMMON USER INTERFACE MODE BASED ON ORIENTATION

TECHNICAL FIELD

The present disclosure relates to electronic devices and, more particularly, to methods and electronic devices to allow a common user interface mode on a plurality of electronic devices.

BACKGROUND

Electronic devices such as smartphones, tablet computers, laptop and personal computers have become ubiquitous.

Such devices are typically each associated with a defined set of input and output devices. For example, electronic devices are often equipped with a display which is configured to provide a user interface on such electronic devices. Such electronic devices are also often equipped with one or more input mechanisms such as, for example, a keyboard, and one or more navigational input mechanism such as a mouse, track pad, or trackball. Recently, touchscreen displays which provide both input and output functionality have become common in electronic devices. Such touchscreen displays may provide navigational input and, in some devices, alphanumeric input through the use of virtual keyboards.

Some electronic devices may be connected to additional peripherals in order to provide further input or output capabilities. For example, a user may connect a further display to a computer to provide additional display capabilities.

Expanding an electronic device's resources by connecting that electronic device to additional peripherals may, however, require a user to purchase such additional peripherals such as, for example, an additional display and/or an additional input mechanism.

BRIEF DESCRIPTION OF THE DRAWINGS

FIG. 2 is a front view of a smartphone in accordance with example embodiments of the present disclosure;

FIG. 3 is a front view of a tablet computer is accordance with example embodiments of the present disclosure;

FIG. 8 is a front view of two electronic devices having interface elements in accordance with example embodiments of the present disclosure;

Like reference numerals are used in the drawings to denote like elements and features.

DETAILED DESCRIPTION OF EXAMPLE EMBODIMENTS

Figure 1:
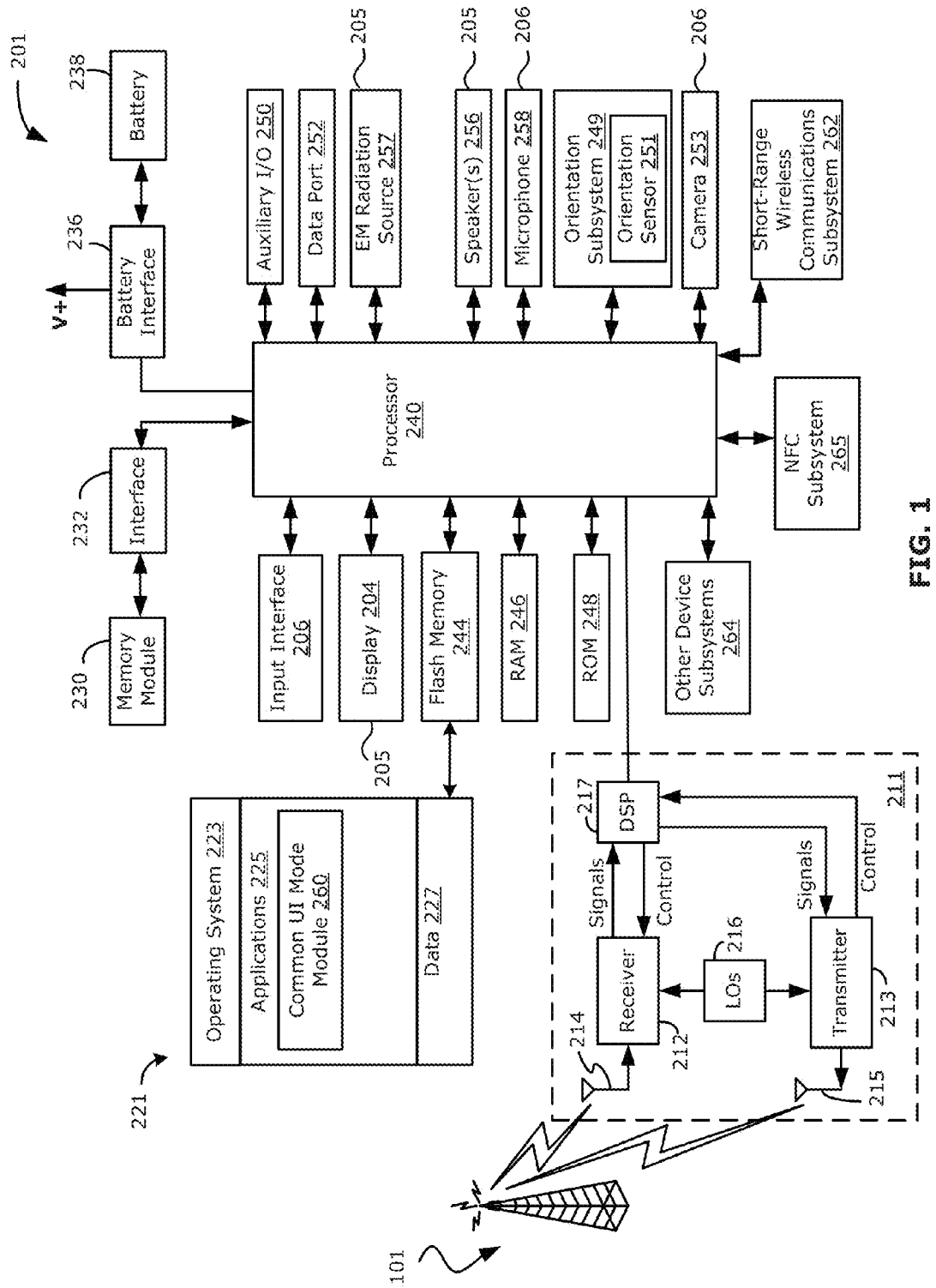
FIG. 1 is a block diagram illustrating an electronic device in accordance with example embodiments of the present disclosure.

In one aspect, the present disclosure describes a method of allowing a common user interface mode on a first electronic device and a second electronic device. The method includes: receiving first orientation data from an orientation sensor associated with the first electronic device; receiving, at the first electronic device, second orientation data from the second electronic device; determining, from the first orientation data and the second orientation data, if the orientation of the first electronic device and the second electronic device satisfy one or more predetermined orientation criterion; and if the orientation of the first electronic device and the second electronic device satisfy the one or more predetermined orientation criterion, allowing the first electronic device and the second electronic device to enter a common user interface mode.

In another aspect, the present disclosure describes a first electronic device. The first electronic device includes an orientation sensor and a communication subsystem for establishing wireless communications with a second electronic device. The first electronic device also includes a display and a processor. The processor is configured for: receiving first orientation data from an orientation sensor associated with the first electronic device; receiving, at the first electronic device, second orientation data from the second electronic device; determining, from the first orientation data and the second orientation data, if the orientation of the first electronic device and the second electronic device satisfy one or more predetermined orientation criterion; and if the orientation of the first electronic device and the second electronic device satisfy the one or more predetermined orientation criterion, allowing the first electronic device and the second electronic device to enter a common user interface mode.

In another aspect, the present disclosure describes a second electronic device. The second electronic device includes an orientation sensor for obtaining second orientation data. The second electronic device also includes a communication subsystem for establishing wireless communications with the first electronic device described above. The second electronic device also includes a display and a processor which is configured to provide second orientation data to the first electronic device.

Other example embodiments of the present disclosure will be apparent to those of ordinary skill in the art from a review of the following detailed description in conjunction with the drawings.

As will be described in greater detail below, at least some example embodiments of the present disclosure describe electronic devices (such as a mobile communication devices including smartphones, tablet computers and wearable computers, such as watches including electronic or digital watches), methods, communication systems, and computer-readable mediums which allow such electronic devices to interact with other electronic devices. More particularly, as will be described in greater detail below, electronic devices may be configured to enter a common user interface mode with other electronic devices. When in the common interface mode, one or more resources associated with the electronic devices may be shared. For example, a first electronic device may be permitted to use one or more resources associated with a second electronic device when the first electronic device and the second electronic device are in the common user interface mode.

In the common user interface mode, two or more electronic devices operate cooperatively. In some example embodiments, display resources associated with the electronic devices are shared. For example, an electronic device (such as a first electronic device) may be permitted to control a display which is provided on another electronic device (such as a second electronic device) when those two electronic devices are in the common interface mode. For example, in at least some example embodiments, the common user interface mode may be an extended desktop mode in which a user interface generated by one of a first electronic device or a second electronic device is spanned to include the displays of both the first electronic device and the second electronic device. Example common user interface modes will be discussed in greater detail below.

The two or more electronic devices which are configured to enter a common user interface mode with one another may, for example, be any combination of: smartphones, tablet computers, wearable computers (such as watches), mobile telephones or PDAs (personal digital assistants) enabled for local wireless communication, or computer systems. That is, a first electronic device which enters a common user interface mode with a second electronic device may, in various example embodiments, be any one of the electronic devices listed above and the second electronic device may also be any one of the electronic devices listed above. Other types of electronic devices, apart from those specifically listed above, are also possible.

In some example embodiments two or more of the same type of electronic device may enter a common user interface mode. For example, a smartphone may be configured to enter a common user interface mode with another smartphone. By way of further example, a tablet computer may be configured to enter a common user interface mode with another tablet computer.

In some example embodiments, the two or more electronic devices which are configured to enter a common user interface mode with one another may not be of the same type. For example, a smartphone may be configured to enter a common user interface mode with a tablet computer.

A tablet computer (which may also be referred to as a tablet) is a mobile computer which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height with is seven inches (7") or more.

In at least some example embodiments, at least one of the electronic devices which are configured to enter a common user interface mode with another electronic device may be a slate computer. A slate computer is a tablet computer which does not include a dedicated keyboard. A slate computer may allow for text input through the use of a virtual keyboard or an external keyboard which connects to the slate computer via a wired or wireless connection.

Accordingly, electronic devices which are configured to enter a common user interface mode may take a variety of forms. An example of one such electronic device 201 will now be discussed.

Example Electronic Device

Reference will now be made to FIG. 1 which illustrates an example electronic device 201 in which example embodiments described in the present disclosure can be applied. An electronic device 201 such as the electronic device 201 of FIG. 1 may be configured to enter a common user interface mode with another electronic device 201, which may also be of the type illustrated in FIG. 1. It will be appreciated that one or more of the electronic devices 201 which are configured to enter the common UI mode may be of a type which differs from the electronic device 201 of FIG. 1 and that some of the features, systems or subsystems of the electronic device 201 discussed below with reference to FIG. 1 may be omitted from electronic devices 201 which are configured to enter a common user interface mode with other electronic devices 201.

In the illustrated example embodiment, the electronic device 201 is a communication device and, more particularly, is a mobile communication device having data and voice communication capabilities, and the capability to communicate with other computer systems; for example, via the Internet. It will, however, be appreciated that the electronic device 201 may take other forms, including any one of the forms listed above.

Depending on the functionality provided by the electronic device 201, in various example embodiments the electronic device 201 may be a multiple-mode communication device configured for both data and voice communication, a mobile telephone, such as a smartphone, a wearable computers such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (FIG. 3) which surrounds the display 204. In such example embodiments, the frame 312 (FIG. 3) may be referred to as an active frame since it is capable of acting as an input interface 206. In at least some example embodiments, the touch-sensitive overlay may extend to the sides of the electronic device 201.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may, in at least some example embodiments, include a near field communications (NFC) subsystem 265. The NFC subsystem 265 is configured to communicate with other electronic devices 201 and/or tags, using an NFC communications protocol. NFC is a set of short-range wireless technologies which typically require a distance of 4 cm or less for communications. The NFC subsystem 265 may include an NFC chip and an NFC antenna.

The electronic device 201 may include a microphone and/or one or more speakers. In at least some example embodiments, an electronic device 201 may include a plurality of speakers 256. For example, in some example embodiments, the electronic device 201 may include two or more speakers 265. The two or more speakers 256 may, for example, be disposed in spaced relation to one another. That is, in at least some example embodiments, the electronic device 201 may include a first speaker and a second speaker and the first speaker and the second speaker may be spatially separated from one another within the electronic device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some example embodiments, each speaker 256 may be associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some example embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 and/or the housing of the electronic device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a common user interface (UI) mode between the electronic device 201 and another electronic device 201 which may, in at least some example embodiments, be an electronic device 201 which is the same or similar to the electronic device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such a common user interface (UI) mode module 260. In the example embodiment of FIG. 1, the common UI mode module 260 is implemented as a stand-alone application 225. However, in other example embodiments, the common UI mode module 260 could be implemented as part of the operating system 223 or another application 225.

The common UI mode module 260 may be configured to allow the electronic device 201 to enter a common user interface mode with another electronic device 201 which is within the range of the short-range wireless communication subsystem 262. As will be described below with respect to FIGS. 4 to 14, in at least some example embodiments, the common UI mode module 260 may be configured to interact with a corresponding common UI mode module 260 on the other electronic device in order to provide a common user interface mode on both devices if one or more predetermined conditions are satisfied.

When in the common interface mode, one or more resources associated with the electronic devices 201 may be shared. For example, a first electronic device may be permitted to use one or more resources associated with a second electronic device when the first electronic device and the second electronic device are in the common user interface mode.

The common UI mode modules 260 on the first electronic device and the second electronic device are configured so that, when two or more electronic devices are placed in a common user interface mode, those electronic devices operate cooperatively. That is, when in the common user interface mode, the electronic devices interact to a greater degree than when the electronic devices are not in the common user interface mode. In some example embodiments, display resources associated with the electronic devices are shared when those electronic devices 201 are in the common user interface mode. For example, an electronic device (such as a first electronic device) may be permitted to control a display 204 which is provided on another electronic device (such as a second electronic device) when the common UI mode modules 260 of those electronic devices has placed those two electronic devices in the common user interface mode. For example, in at least some example embodiments, the common user interface mode may be an extended desktop mode in which a user interface generated by one of a first electronic device or a second electronic device is spanned to include the displays of both the first electronic device and the second electronic device.

In at least some example embodiments (which will be discussed in greater detail below with reference to FIGS. 9 to 12), the common UI mode modules 260 associated with two or more electronic devices 201 may be configured to allow the electronic devices 201 to enter the common user interface mode if orientation data from orientation sensors 251 associated with the electronic devices satisfies one or more predetermined orientation criterion. For example, in at least some example embodiments, in order to enter the common UI mode, two or more electronic devices must have a common orientation. In some example embodiments, in order to enter the common UI mode, the two or more electronic devise must be oriented along a common plane. In some example embodiments, the two or more electronic devices may be allowed to enter a common user interface mode if they are both orientated in a table-top orientation. The table-top orientation is an orientation where the electronic devices 201 are horizontal or substantially horizontal. In some example embodiments, the table-top orientation occurs when a back face of the electronic device 201 rests on a horizontal structure, such as a table. In at least some example embodiments, if two or more electronic devices 201 are oriented in the table-top orientation, then they may be permitted to enter the common UI mode with one another.

Similarly, in at least some example embodiments, the two or more electronic devices may be allowed to enter a common user interface mode if they are both oriented in an orientation associated with a docking or support accessory for the electronic devices 201. The docking or support accessory may be an accessory which is configured to rest upon a table-top (or other horizontal support structure). In some example embodiments, the docking or support accessory may be configured to receive two or more electronic devices 201. The docking accessory or support may have supports which receive the electronic devices 201 in predetermined orientations. In such example embodiments, if two or more electronic devices 201 are in the orientations associated with the docking or support accessory, then the common UI mode modules 260 associated with the electronic devices 201 may place the electronic devices in a common UI mode. In at least some example embodiments, the docking or support accessory may be a desktop phone support station such as the type described below with reference to FIG. 10.

In some example embodiments, in order to determine whether the predetermined orientation criteria which acts as a precondition to the common UI mode is satisfied, one or more of the electronic devices may share orientation data with another of the electronic devices. In some example embodiments, such sharing may occur as a result of a pairing of the electronic devices. That is, when the electronic devices 201 are paired using Bluetooth™ or another wireless protocol, at least one of those electronic devices 201 may share orientation data regarding that electronic device's orientation with a paired electronic device 201 when the electronic devices are within the coverage area of one another's short range wireless subsystem 262.

In some example embodiments, in order to customize the common UI mode to the specific orientation of the electronic devices relative to one another, the common UI mode modules 260 of the electronic devices may be configured to determine a relative orientation of the electronic devices and to use the relative orientation to provide a common user interface mode in which the orientation of a common user interface displayed on a display associated with one of the electronic devices and a display associated with another of the electronic devises is determined in accordance with the determined relative orientation of those electronic devices. For example, in at least some example embodiments, the common UI mode modules 260 of the electronic devices 201 may be configured to select a side of each of the electronic devices as a shared side and to orient the common user interface based on the shared side. In some example embodiments, the shared side is the nearest edge of the displays of the electronic devices. In such example embodiments, in the common UI mode, a user interface may be displayed so that it spans the shared side.

In at least some example embodiments, cameras 253 associated with the electronic devices may be used in order to determine the relative orientation of two or more electronic devices 201. Such example embodiments will be discussed in greater detail below with reference to FIG. 13. As will be described in greater detail below, in at least some example embodiments, images may be captured by two or more cameras 253 associated with two or more electronic devices which are wirelessly connected (e.g. electronic device which have been "paired"). The images may be captured at a common time and may be shared between the electronic devices 201. One or more of the electronic devices 201 may analyze the images to determine a relative orientation of the electronic devices 201. More particularly, in at least some example embodiments, one or more of the common UI mode modules 260 associated with one or more of the electronic devices 201 may identify one or more common features in images which were captured at approximately the same time and which were captured on different electronic devices 201. That is, the common UI mode module(s) 260 may identify common features in a first image captured on a first electronic device 201 and a second image captured on a second electronic device 201 in order to determine the relative orientation of the first electronic device 201 to the second electronic device 201.

In at least some example embodiments, audio location and/or orientation methods may be employed in order to determine the relative orientation of a first electronic device 201 and a second electronic device 201. In some example embodiments, the electronic devices 201 may participate in audio based communications with one another and such audio based communication may be used in order to determine the relative orientation of the electronic devices.

Methods and systems for using audio signals to determine the relative orientations of two or more electronic devices 201 will be discussed in greater detail below with reference to FIG. 14.

The software applications 225 on the electronic device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device

As discussed above, electronic devices 201 which may collectively enter a common user interface mode may take a variety of forms. For example, in at least some example embodiments, one or more of the electronic devices which are configured to enter a common user interface mode with another electronic device may be a smartphone.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 may include the components discussed above with reference to FIG. 1 or a subset of those components. The smartphone 100 includes a housing 104 which houses at least some of the components discussed above with reference to FIG. 1.

In the example embodiment illustrated, the smartphone includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of and/or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of and/or surrounding the front side of the smartphone 100. Such electromagnetic radiation (or the projection of electromagnetic radiation onto objects) may be captured on images obtained by the camera 253.

Example Tablet Electronic Device

In at least some example embodiments, the one or more of the electronic devices 201, which are configured to enter a common user interface mode with another electronic device 201, may be a tablet computer. Referring now to FIG. 3, a front view of an example electronic device 201 which is a tablet computer 300 is illustrated.

The tablet computer 300 of FIG. 3 may include many of the same features and components of the smartphone 100 of FIG. 2. However, the tablet computer 300 of FIG. 3 is generally larger than the smartphone 100 of FIG. 2. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

A frame 312 surrounds the display 204. The frame 312 is portion of the housing 304 which provides a border around the display 204. In at least some example embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The example tablet computer 300 includes a plurality of speakers 256. In the example embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204. Both speakers 256 are disposed on the front side 302 of the tablet computer 300.

The example tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other example embodiments.

The example tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of and/or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of and/or surrounding the front side 302 of the tablet computer 300. Such electromagnetic radiation (or the projection of electromagnetic radiation onto objects) may be captured on images obtained by the camera 253.

Enabling a Common User Interface Mode

Figure 4:
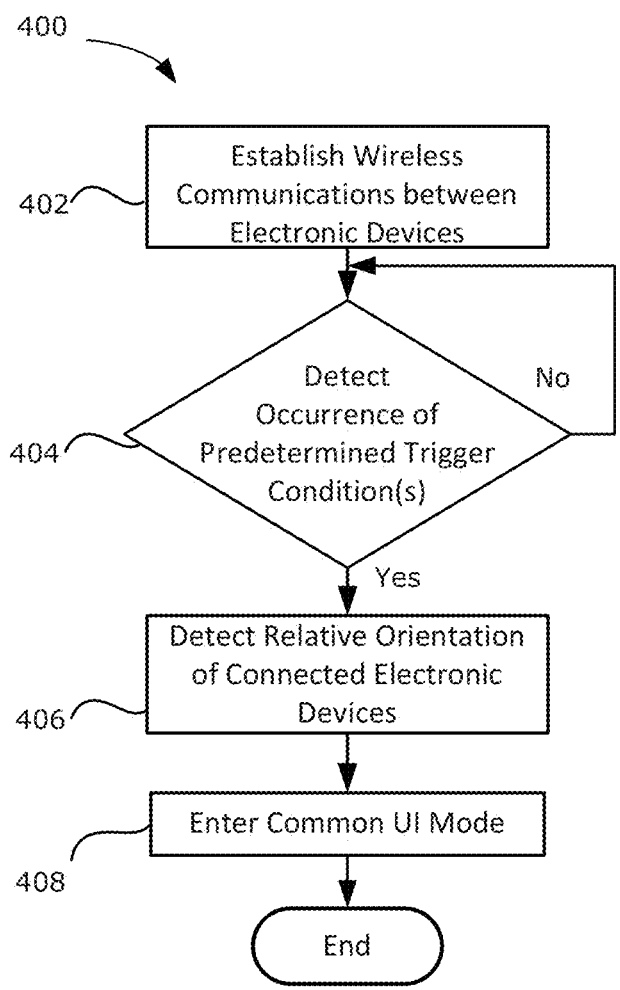
FIG. 4 is a flowchart of a method of entering a common user interface mode in accordance with example embodiments of the present disclosure.

Reference will now be made to FIG. 4 which illustrates a flowchart of a method 400 for entering a common user interface mode on two or more electronic devices 201. The two or more electronic devices 201 may be of the types discussed above with reference to FIGS. 1 to 3. For example, in at least some example embodiments, one or more of the electronic devices 201 may be a smartphone 100 such as the smartphone 100 illustrated in FIG. 2. In at least some example embodiments, one or more of the electronic devices 201 may be a tablet computer, such as the tablet computer 300 discussed above with reference to FIG. 3.

One or more of the electronic devices 201 may be configured to perform the method 400 of FIG. 4. More particularly, the method 400 may be performed by one of the electronic devices 201 in cooperation with another one of the electronic devices 201.

In at least some example embodiments, the processor 240 (FIG. 1) of one of the electronic device 201 (FIG. 1) is configured to perform the method 400. More particularly, in at least some example embodiments, one or more application 225 (FIG. 1) or module stored in memory of the device 201 (FIG. 1) may be configured to perform the method 400 of FIG. 4. One or more applications 225 (FIG. 1) may contain computer readable instructions which cause the processor 240 (FIG. 1) of the electronic device 201 (FIG. 1) to perform the method 400. In at least some example embodiments, the common UI mode module 260 may be configured to perform the method 400 of FIG. 4. More particularly, the common UI mode module 260 may include computer readable instructions which, when executed, cause the processor 240 (FIG. 1) to perform the method 400 of FIG. 4.

The method 400 of FIG. 4 may, in at least some example embodiments, be provided by other software applications or modules apart from those specifically discussed above; for example, the operating system 223 (FIG. 1). Similarly, any portion of the method 400 of FIG. 4 may be performed by or rely on other applications 225 (FIG. 1) or modules which may interface with common UI mode module 260 (FIG. 1).

At 402, two or more electronic devices 201 may establish wireless communications with one another. These electronic devices 201 may include a first electronic device 201 and a second electronic device 201. The two or more electronic devices 201 may establish wireless communications with one another using short range wireless communication subsystems 262 associated with each of the electronic devices 201. In such example embodiments, the two or more electronic devices 201 may establish wireless communications with one another when they are each physically located within a coverage area provided by the short-range wireless communication subsystem 262 of the other of the electronic devices.

In at least some example embodiments, at 402, the two or more electronic devices 201 may connect via a Bluetooth™ connection. In other example embodiments, other connection protocols may be used. In at least some example embodiments, the connection may be established using short range wireless communications subsystems 262 (FIG. 1) associated with the electronic devices. In some example embodiments, the electronic devices 201 may connect together directly. In other example embodiments, the electronic devices 201 may connect together through one or more server or network. In at least some example embodiments, the electronic devices 201 may connect together via a Wi-Fi™ connection.

In at least some example embodiments, in order to connect, the electronic devices 201 may undergo a pairing process. A pairing process allows a user to control which electronic devices 201 are permitted to connect with one another. In at least some example embodiments, the pairing process may be completed once in order to establish a relationship between two electronic devices 201. After the pairing process is completed, the paired electronic devices 201 have a relationship in which those electronic devices 201 are able to perform more advanced communications with one another. For example, as will be explained below, after those electronic devices 201 are paired, they may be permitted to enter a common user interface mode in response to one or more predetermined trigger conditions.

The pairing process is an additional level of security which ensures that the users associated with a pair of electronic devices 201 would like those electronic devices 201 to be able to communicate with one another. When electronic devices 201 have been paired, they may be referred to as bonded electronic devices 201.

The pairing process may be triggered by a specific request from a user to create a bond. For example, a user may select an option to pair an electronic device to another electronic device using a user interface associated with one of the electronic devices. The pairing process may involve user interaction to ensure that users of each electronic device 201 confirm that the electronic devices 201 are to be paired. In at least some example embodiments the pairing process may ensure that a common user interface mode will only occur on electronic devices 201 if those electronic devices 201 have been identified as being friendly electronic devices. That is, a common user interface mode will only occur if the electronic devices 201 have mutually authenticated one another (i.e. through the pairing process).

During the pairing process, the electronic devices 201 establish a shared secret, which may be referred to as a link key. The link key is stored by both electronic devices 201 which are paired on bonded. Once the pairing process is completed, a bond is formed between the electronic devices which enables those electronic devices to connect to each other in the future without requiring the pairing process in order to confirm the identity of the devices. At the request of a user of either of the electronic devices, this bond can later be severed.

Accordingly, in at least some example embodiments, at 402, two or more electronic devices 201 which have previously undergone a pairing process are communicably connected to one another. That is, the electronic devices 201 establish wireless communications so that data may be shared between the electronic devices 201.

In at least some example embodiments, an operating system 223 or a communication module (such as a Bluetooth™ module) provided on the electronic devices 201 may be configured to perform 402 of FIG. 4.

In at least some example embodiments, at 404 one or more of the electronic devices 201 on which wireless communications were established at 402 monitors to determine whether one or more predetermined trigger conditions have occurred. That is, in at least some example embodiments, the electronic devices 201 are configured to only enter the common user interface mode with one another if one or more predetermined trigger conditions are satisfied.

In at least some example embodiments, one of the predetermined trigger conditions is a predetermined synchronous action. A synchronous action is an action which occurs at approximately the same time on two or more of the connected electronic devices 201. In at least some example embodiments, the synchronous action is a bumping of the electronic devices 201 together. That is, if the electronic devices 201 are bumped together at approximately the same time, then the electronic devices 201 may be permitted to enter a common user interface mode. Such example embodiments will be discussed in greater detail below with reference to FIG. 5.

In at least some example embodiments, one of the predetermined trigger conditions which may cause the electronic devices 201 to enter a common UI mode is a near field communication action associated with NFC subsystems 265 of the electronic devices 201. For example, in at least some embodiments, when the NFC subsystems 265 detect that a pair of electronic devices 201 are tapped together, those electronic devices 201 may enter the common UI mode. Such example embodiments will be discussed in greater detail below with reference to FIG. 6.

In at least some example embodiments, one of the predetermined trigger conditions which may cause the electronic devices 201 to enter a common UI mode is a swiping gesture which is applied across both electronic devices 201. A swiping gesture may be characterized by a touch based gesture which spans two or more electronic devices 201. For example, a swiping gesture may occur when a user runs their finger along the touch sensitive overlay of a first electronic device 201 until they reach an edge of that touch sensitive overlay and then continue running their finger across the touch sensitive overlay of a second electronic device 201, beginning at the edge of the touch sensitive overlay of the second electronic device 201. The common UI mode modules 260 of two or more electronic devices 201 may share touch information with each other and, at least some of those electronic devices 201 may be configured to identify such a swiping gesture. For example, one or more of the common UI mode modules 260 may determine if a first swiping gesture on one of the electronic devices 201 has ended at or near the edge of a touch sensitive overlay of that electronic device and if a second swiping gesture on another of the electronic devices 201 has begun at or near the edge of the touch sensitive overlay of another of the electronic devices within a predetermined period of time after the first swiping gesture. If this criterion is satisfied, then the electronic devices 201 may interpret the gesture as a command to enter the common UI mode. Such example embodiments are discussed in greater detail below with reference to FIG. 7.

In some example embodiments, one of the predetermined trigger conditions which may cause the electronic devices 201 to enter a common UI mode is the activation of one or more interface elements associated with one or more of the electronic devices 201. For example, in at least some example embodiments, each electronic device 201 may display a selectable interface element, such as an icon which a user may select to instruct the electronic devices 201 to enter the common user interface mode. Such example embodiments will be discussed in greater detail below with reference to FIG. 8.

In at least some example embodiments, one of the predetermined trigger conditions which may permit the electronic devices 201 to enter a common UI mode occurs when the orientation of the electronic devices 201 satisfy one or more predetermined orientation criteria. For example, in at least some example embodiments, the electronic devices 201 may be allowed to enter the common UI mode when they are oriented along a common plane. Such example embodiments will be discussed in greater detail below with reference to FIGS. 9 to 12.

In at least some example embodiments, if a common UI mode module 260 determines that the one or more predetermined trigger conditions are satisfied (as determined at 404 of FIG. 4), then the common UI mode modules 260 of the electronic devices 201 may, at 406, attempt to detect the relative orientation of the electronic devices 201 (i.e. the electronic devices which were connected at 402 and which satisfied the predetermined trigger condition(s) at 404). The common UI mode which is provided on the electronic devices 201 may depend on the orientation of the electronic devices 201. That is, in the common UI mode, a common user interface displayed on the displays 204 associated with a first electronic device 201 and a second electronic device 201 may be oriented based on the relative orientation of the electronic devices 201. For example, in at least some example embodiments, the common UI mode modules may identify a side of the display 204 of the first electronic device 201 and a side of the display 204 of the second electronic device 201 which are closer together than any other sides of the display 204 of the first electronic device 201 are to any other sides of the display 204 of the second electronic device 201. That is, the closest sides of the display 204 of the first electronic device 201 and the display 204 of the second electronic device 201 are identified. In at least some example embodiments, the common user interface is displayed to span these closest sides.

The specific method of determining the relative orientation of the electronic devices 201 may depend on the trigger conditions used in 402. For example, in at least some example embodiments in which the trigger condition is a bumping together of the electronic devices 201, the relative orientation of the electronic devices 201 may be determined based on the data obtained from orientation sensors 251 associated with the first electronic device and/or the second electronic device. For example, where the orientation sensors 251 are accelerometers, the accelerometer data may be examined to determine the sides of the electronic devices 201 which were bumped together. The common UI mode module 260 may identify such sides, for example, since a bump is characterized by acceleration of an electronic device in the direction of the other electronic device. By examining the direction of the acceleration prior to (and during) the impact of the electronic devices 201, the common UI mode module 260 may determine the location of the bump.

In at least some example embodiments in which the trigger condition which permits the common UI mode is a swiping gesture the relative orientation of the electronic device may be determined based on the direction of the swiping gesture on each of the electronic devices. For example, as noted above, in at least some example embodiments, the common UI mode modules 260 on the electronic devices 201 may determine if a first swiping gesture on one of the electronic devices 201 has ended at or near the edge of a touch sensitive overlay of that electronic device and if a second swiping gesture on another of the electronic devices 201 has begun at or near the edge of the touch sensitive overlay of another of the electronic devices within a predetermined period of time after the first swiping gesture. In such example embodiments, the relative orientation of the electronic devices 201 may be determined based on the direction of the swiping gestures on each of the electronic devices 201. For example, the common UI mode modules 260 may determine that the closest sides of the displays of the electronic devices are the sides where the first swiping gesture ended and where the second swiping gesture began.

As will be discussed in greater detail below with reference to FIG. 13, in at least some example embodiments, cameras 253 associated with the electronic devices 201 may be used in order to determine the relative orientation of those electronic devices 201.

In at least some example embodiments, an image may be captured on a first electronic device 201 and a second electronic device 201 at approximately the same time and the images may be analyzed by the common UI mode module 260 of one or more of the electronic devices 201 to determine the relative orientation of the first electronic device 201 and the second electronic device 201. For example, one or more common features in the images may be identified and the relative orientation of the first electronic device 201 and the second electronic device 201 may be determined based on those common features.

In at least some example embodiments, an audio based method may be used in order to determine the relative orientation of the electronic devices 201. Such example embodiments will be discussed in greater detail below with reference to FIG. 14. More particularly, in at least some example embodiments, a sound may be sequentially emitted from a first speaker 256 of an electronic device followed by a second speaker 256 of the same electronic device 201. Each of the sounds may be received at a microphone 258 of another electronic device 201. The relative orientation of the electronic devices 201 may be determined based on these sounds. More particularly, information related to the sounds may be used in order to approximate the distance of the first speaker 256 relative to the microphone 258 and the distance of the second speaker 256 relative to the microphone. From this information, the relative orientation of the electronic devices 201 may be determined.

At 408, the electronic devices 201 may enter a common UI mode. In the common UI mode, resources associated with the first electronic device 201 are shared with resources associated with a second electronic device 201. More particularly, in at least some example embodiments, in the common UI mode, display resources associated with the electronic devices 201 may be pooled. In at least some example embodiments, in the common UI mode, a display 204 associated with a first electronic device 201 and a display 204 associated with a second electronic device 201 operate cooperatively. In at least some example embodiments, when in the common UI mode, the orientation of a common user interface displayed on the displays is determined in accordance with the relative orientation of the electronic devices (i.e. as determined at 406).

In at least some example embodiments, the electronic devices 201 are configured to permit one of the first electronic device or the second electronic device to act as a primary device to control the display 204 of the other of the first electronic device or the second electronic device when the electronic devices are in the common UI mode. That is, in the common UI mode, one of the electronic devices 201 may operate as a master device (which may also be referred to as a primary device) and one of the electronic devices 201 may operate as a slave-like device (which may also be referred to as a secondary device). The master device may control the overall display on both the master device and the slave-like device. In at least some example embodiments, electronic devices operate autonomously (i.e. they both control their own operation using their own processor) when they are not in the common UI mode and, when in the common UI mode, at least one of the electronic devices surrenders its autonomy and allows its resources to be used by another of the electronic devices 201.

In at least some example embodiments, when in the common UI mode, the electronic devices 201 may be permitted to share input resources. That is, one or more input interface 206 associated with one of the electronic devices 201 may be used to provide input to another one of the electronic devices 201. For example, input may be received via a touch sensitive overlay associated with one of the electronic devices and may be transmitted to another of the electronic devices 201.

Common UI modes may allow for the sharing of other resources instead of or in addition to input and display resources. For example, in at least some example embodiments, software resources, such as one or more applications, may be shared on the electronic devices 201 when those devices are in the common UI mode. Similarly, in at least some example embodiments, speaker resources (such as the speakers 256 of the electronic devices 201) may be shared in the common UI mode. Such example embodiments may permit the electronic devices to collectively provide audio through a greater number of speakers than any one of the electronic devices could individually provide. For example, in at least some example embodiments, the speaker resources of the electronic devices 201 may be pooled so that the electronic devices 201 are capable of playing audio with a greater number of channels than any one of the electronic devices could individually provide.

In at least some example embodiments, the electronic devices 201 may be configured to provide a plurality of common UI modes. In such example embodiments, the specific common UI mode which is provided may depend, at least in part, upon the orientation of the electronic devices 201. For example, in at least some example embodiments, if both electronic devices 201 are oriented in an orientation which is associated with a docking or support accessory (see, for example, FIG. 10), then the common UI mode which is provided may be different than the common UI mode which will be provided if both electronic devices 201 are oriented in a tabletop orientation (see, for example, FIG. 9). In such example embodiments, the common UI mode module 260 of one or more of the electronic devices 201 may be configured to determine the absolute orientations of the electronic devices (i.e. the orientation of the electronic devices 201 relative to gravity) and to select the common UI mode based on these orientations. In at least some example embodiments, if the electronic devices 201 are oriented in an orientation associated with a docking or support accessory, the electronic devices 201 may enter a common user interface mode which is a desktop phone mode in which one of the electronic devices acts as a handset (which may display numbers) and the other of the electronic devices acts as a display (which may display other information, such as weather, applications, appointments, emails, etc).

In at least some example embodiments, the common UI mode which is provided may be an extended desktop mode in which a user interface generated by one of the first electronic device or the second electronic device is spanned to include the display of both the first electronic device and the second electronic device.

In at least some of the common UI modes, it may be useful to select one of the electronic devices 201 as a primary or master device and another of the electronic devices 201 as a slave-like or secondary device. In such example embodiments, the common UI mode module 260 of one or more of the electronic devices 201 may be configured to make this selection based on one or more predetermined rules. For example, in at least some example embodiments, the common UI mode module(s) 260 may determine which of the electronic devices 201 has better processing capabilities and may select that electronic device 201 as the primary/master device and may select the other of the electronic devices 201 as the secondary/slave-like device.

In at least some example embodiments, the primary/master device may be selected based on user input received through one or more of the electronic devices 201. Other methods of selecting the primary/master device are also possible.

Trigger Conditions

Trigger conditions which may be used to cause the electronic devices 201 to enter the common UI mode which may be used in accordance with example embodiments will now be discussed.

Trigger Condition for Common UI Mode: Bumping Electronic Devices

Figure 5:
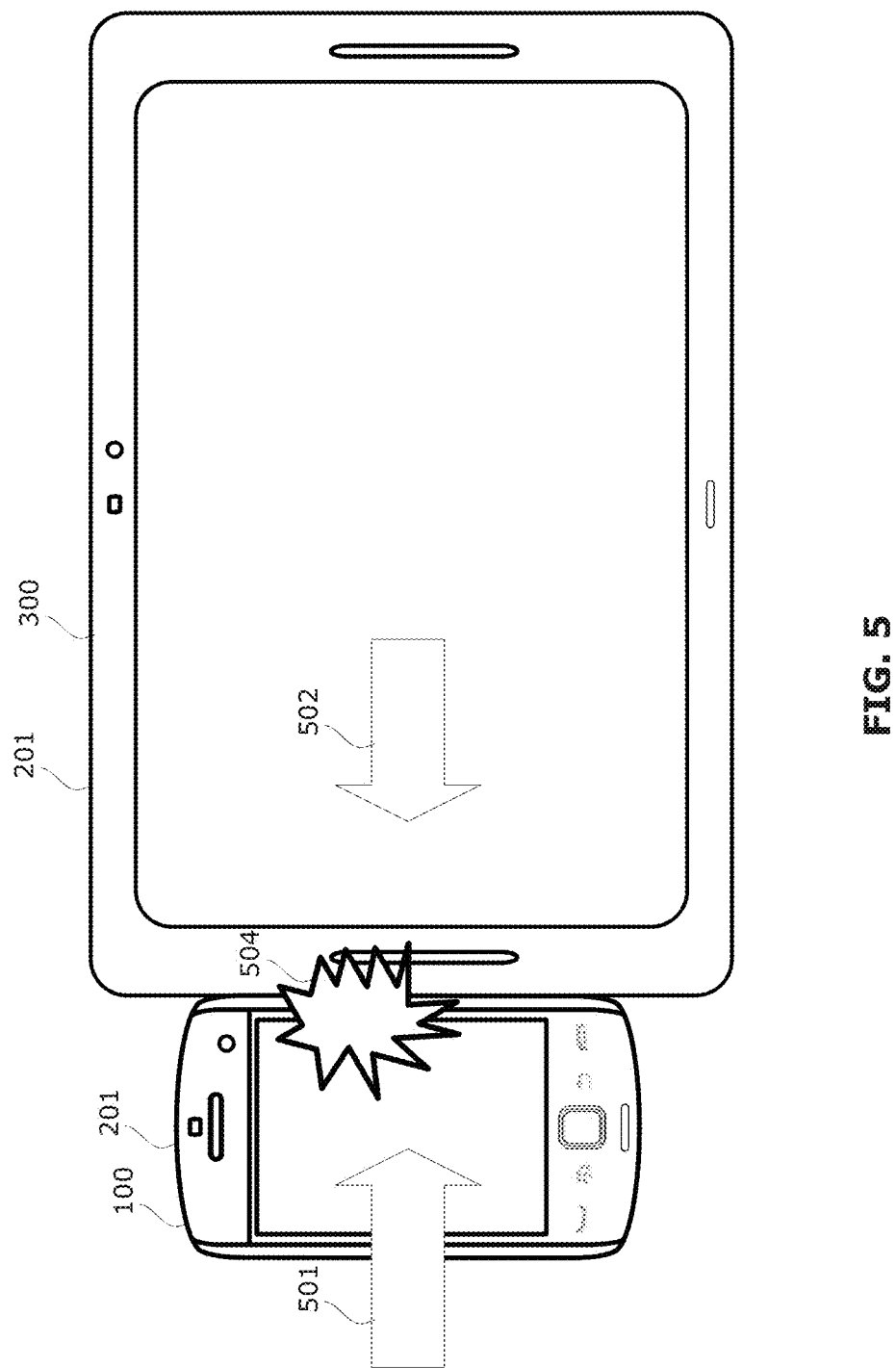
FIG. 5 is a front view of two electronic devices to which a bumping gesture is applied in accordance with example embodiments of the present disclosure.

As noted above, in at least some example embodiments, a pair of electronic devices 201 may be configured to enter a common UI mode if the electronic devices 201 are bumped together. Referring now to FIG. 5, one such example embodiment will be discussed.

The example embodiment of FIG. 5 illustrates two electronic devices 201, including a first electronic device 201 and a second electronic device 201. In the example embodiment illustrated, the electronic devices 201 include a smartphone 100 and a tablet computer 300. However, in other example embodiments, other electronic devices 201 may be used. For example, in at least some example embodiments, the electronic devices 201 may be two smartphones 100 or two tablet computers 300. In the example embodiment illustrated, both of the electronic devices 201 are bumped together. The bumping of the electronic devices 201 is characterized by movement of one or more of the electronic devices 201 towards another of the electronic devices, followed by a period of abrupt deceleration of the electronic devices at the point when the electronic devices impact one another. For example, in the example illustrated, the smartphone 100 is moved along a first direction of movement 501 towards the tablet computer 300 and the tablet computer is moved along a second direction of movement 502 towards the smartphone 100. The movement abruptly ceases when the electronic devices 201 bump into one another at a point of impact 504.

In at least some example embodiments, electronic devices 201 which are connected (for example, at 402 of FIG. 4), may be configured to share orientation data from their orientation sensors 251. For example, one or more of the electronic devices 201 may share accelerometer data with another one or more of the electronic devices 201. One or more common UI mode modules 260 associated with one or more of the electronic devices 201 may be configured to analyze such accelerometer data to determine whether the electronic devices 201 were bumped together. For example, the common UI mode module may determine whether both electronic devices 201 experienced an impact at approximately the same time. The common UI mode modules 260 may look for a spike in the accelerometer data from both electronic devices which occurred at the same time.

In at least some example embodiments, if the common UI mode module 260 determines that the electronic devices 201 were bumped together, the common UI mode modules 260 may cause the electronic devices 201 to enter a common UI mode. That is, in at least some example embodiments, the bumping of the electronic devices 201 together may be a precondition which causes the bumped electronic devices 201 to enter a common UI mode. In at least some example embodiments, the bumping of the electronic devices 201 may, when taken alone, cause the electronic devices 201 to enter a common UI mode. In other example embodiments, the bumping together of the electronic devices 201 may only cause the electronic devices to enter the common UI mode if another predetermined trigger condition is satisfied. The other predetermined trigger condition may, in at least some example embodiments, be one of the other predetermined trigger conditions discussed herein.

Trigger Condition for Common UI Mode: NFC Action

Figure 6:
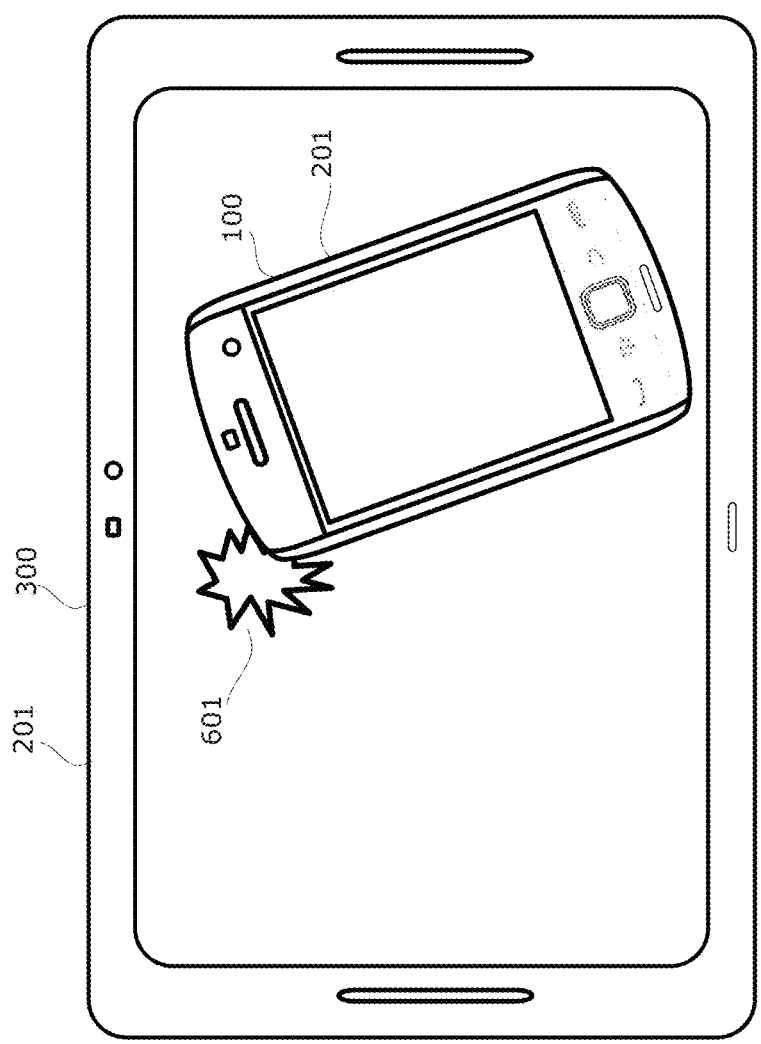
FIG. 6 is a front view of two electronic devices to which a near field communication (NFC) tapping action is applied in accordance with example embodiments of the present disclosure.

As further noted above, in at least some example embodiments, one of the predetermined trigger conditions which may cause the electronic devices 201 to enter a common UI mode is a near field communication action associated with NFC subsystems 265 of the electronic devices 201. Referring now to FIG. 6, one such example embodiment will be discussed.

The example embodiment illustrates two electronic devices 201, including a first electronic device and a second electronic device. In the example embodiment illustrated, the electronic devices 201 include a smartphone 100 and a tablet computer 300. However, in other example embodiments, other electronic devices 201 may be used. For example, in at least some example embodiments, the electronic devices 201 may be two smartphones 100 or two tablet computers 300. In the example embodiment illustrated, both of the electronic devices 201 are tapped together at a contact point 601.

In at least some example embodiments, when an NFC equipped electronic device 201 (i.e. an electronic device 201 having an NFC subsystem 265) is moved within an NFC coverage area of an antenna of an NFC subsystem 265 of another NFC equipped electronic device 201, and those electronic devices are tapped together, a common UI mode module 260 associated with one or more of the devices 201 may cause the electronic devices to enter the common UI mode. That is, the common UI mode module 260 may receive NFC data from an NFC subsystem 265 of the electronic devices 201. If the NFC data indicates that the electronic devices 201 were tapped together, then the common UI mode module 260 may allow the electronic devices 201 to enter the common UI mode.

In at least some example embodiments, the tapping of the electronic devices 201 may, when taken alone, cause the electronic devices 201 to enter a common UI mode. In other example embodiments, the tapping together of the electronic devices 201 may only cause the electronic devices to enter the common UI mode if another predetermined trigger condition is satisfied. The other predetermined trigger condition may, in at least some example embodiments, be one of the other predetermined trigger conditions discussed herein.

Trigger Condition for Common UI Mode: Swiping Across Electronic Devices

As noted previously, in at least some example embodiments, one of the predetermined trigger conditions which may cause the electronic devices 201 to enter a common UI mode is a swiping gesture. A swiping gesture may, in some example embodiments, be defined as a gesture which forms a continuous motion from one electronic device to the other electronic device along touch sensitive surfaces of the electronic devices 201.

Figure 7:
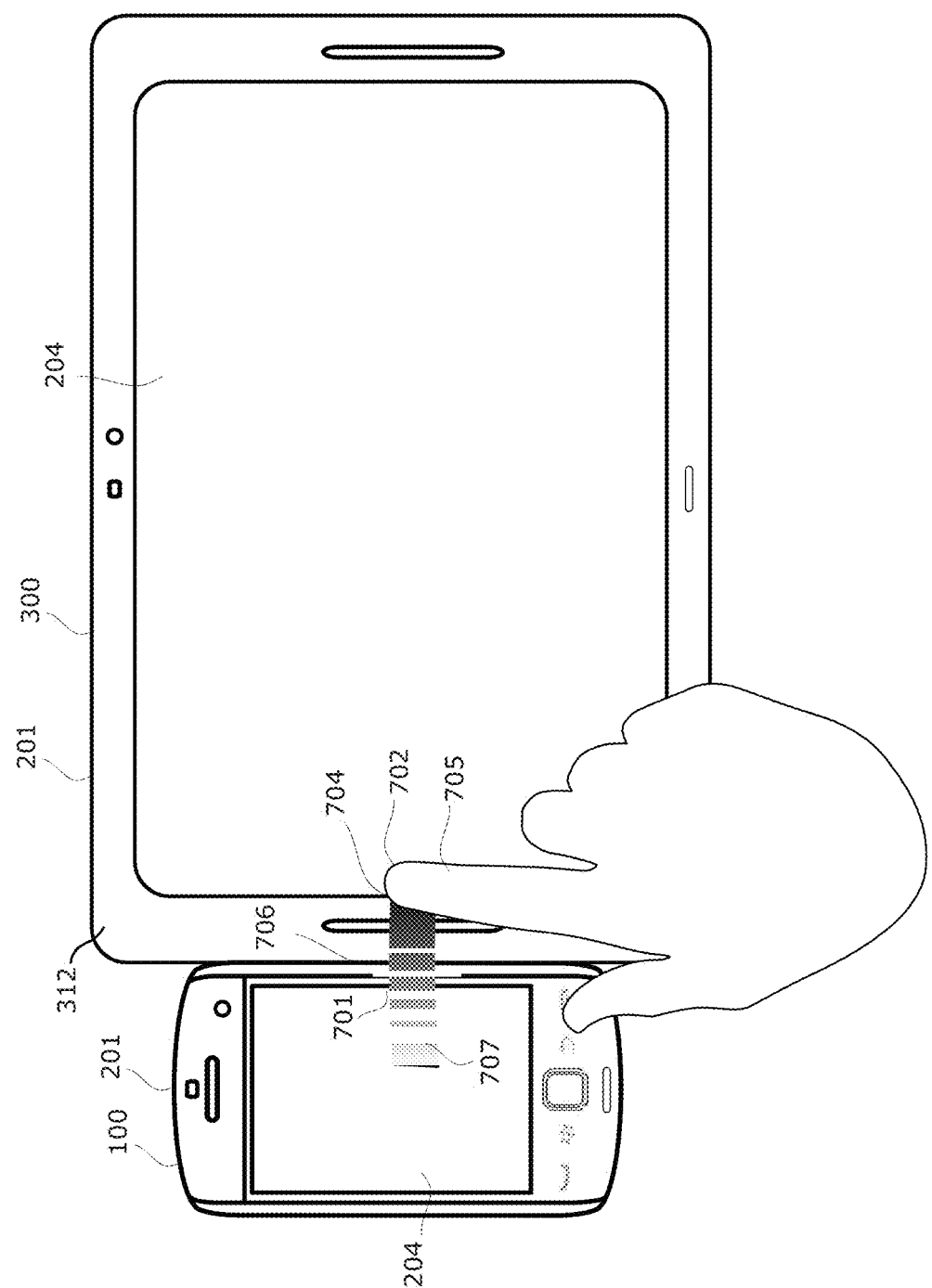
FIG. 7 is a front view of two electronic devices to which a swiping gesture is applied in accordance with example embodiments of the present disclosure.

Referring now to FIG. 7, one such example embodiment is illustrated. The example embodiment illustrates two electronic devices 201, including a first electronic device and a second electronic device. In the example embodiment illustrated, the electronic devices 201 include a smartphone 100 and a tablet computer 300. However, in other example embodiments, other electronic devices 201 may be used. For example, in at least some example embodiments, the electronic devices 201 may be two smartphones 100 or two tablet computers 300.

A swiping gesture may be characterized by a touch based gesture which spans two or more electronic devices 201. For example, a swiping gesture may occur when a user runs their finger 705 along the touch sensitive overlay of a first electronic device 201 until they reach an edge 701 of that touch sensitive overlay and then continue running their finger across the touch sensitive overlay of a second electronic device 201, beginning at the edge 704 of the touch sensitive overlay of the second electronic device 201. In the example embodiment illustrated, the swiping gesture begins at a point 707 on the display 204 of one of the electronic devices 201 and ends at a point 702 on the display 204 of another one of the electronic devices 201.

The common UI mode modules 260 of two or more electronic devices 201 may share touch information with each other and, at least some of those electronic devices 201 may be configured to identify such a swiping gesture. For example, one or more of the common UI mode modules may determine if a first swiping gesture on one of the electronic devices 201 has ended at or near the edge 701 of a touch sensitive overlay of that electronic device and if a second swiping gesture on another of the electronic devices 201 has begun at or near the edge 704 of the touch sensitive overlay of another of the electronic devices within a predetermined period of time after the first swiping gesture. If this criterion is satisfied, then the electronic devices 201 may interpret the gesture as a command to enter the common UI mode.

In some example embodiments, one or more of the electronic devices may be equipped in an active frame 312. A frame is a portion of the housing of the electronic device 201 which frames the display 204 of the electronic device 201. An active frame 312 is a frame which has a touch sensitive overlay which allows the electronic device 201 to detect a touch applied to the frame. An active frame 312 may be useful in detecting swiping gestures which span two or more electronic devices since it allows the touch sensitive portion of the electronic device to be in close proximity to the edge of the electronic device.

For example, in example embodiments in which one or more of the electronic devices 201 includes an active frame 312, one or more of the electronic devices 201 may be configured to identify a swiping gesture which spans two or more electronic devices by determining if a first swiping gesture on one of the electronic devices 201 has ended at or near the edge 701 of a touch sensitive overlay of that electronic device and if a second swiping gesture on another of the electronic devices 201 has begun at or near the edge 706 of the touch sensitive overlay of another of the electronic devices within a predetermined period of time after the first swiping gesture. If one or more of the edges 701, 706 involved in this analysis is an exterior edge of an active frame 312, then the predetermined period of time may be less than if the edge is not the exterior edge of the active frame 312 since a lesser amount of the swiping gesture is spent on a portion of the electronic devices 201 which are incapable of detecting a touch input.

Accordingly, in at least some example embodiments, a method of entering a common UI mode on two or more electronic devices 201 based on a swiping gesture is provided. At least one of the electronic devices may include an active frame. In at least some such example embodiments, a common UI mode module 260 associated with one or more of the electronic devices 201 may be configured to allow the electronic devices to enter a common UI mode if a first swiping gesture on one of the electronic devices 201 has ended at or near the edge 701 of a touch sensitive overlay of that electronic device and if a second swiping gesture on another of the electronic devices 201 has begun at or near the edge 706 of the touch sensitive overlay of another of the electronic devices within a predetermined period of time after the first swiping gesture. In at least some example embodiments, at least one of the edges is an exterior edge 706 of the active frame.

In at least some example embodiments, a swiping gesture spanning two or more electronic devices 201 may, when taken alone, cause the electronic devices 201 to enter a common UI mode. In other example embodiments, the swiping gesture may only cause the electronic devices to enter the common UI mode if another predetermined trigger condition is satisfied. The other predetermined trigger condition may, in at least some example embodiments, be one of the other predetermined trigger conditions discussed herein.

Trigger Condition for Common UI Mode: Activation of Interface Element(s)

As noted in the discussion of FIG. 4 above, in some example embodiments, a predetermined trigger condition which may cause the electronic devices 201 to enter a common UI mode is the activation of one or more interface elements associated with one or more of the electronic devices 201.

Referring now to FIG. 8, one such example embodiment is illustrated. The example embodiment illustrates two electronic devices 201, including a first electronic device and a second electronic device. In the example embodiment illustrated, the electronic devices 201 include a smartphone 100 and a tablet computer 300. However, in other example embodiments, other electronic devices 201 may be used. For example, in at least some example embodiments, the electronic devices 201 may be two smartphones 100 or two tablet computers 300.

In some example embodiments, an interface element 802 may be displayed on one or more connected electronic devices 201 (i.e. electronic devices which connected at 402 of FIG. 4) which allows those electronic devices 201 to enter a common UI mode with one another. In at least some example embodiments, the interface element 802 may be a selectable icon which may be displayed on one or more of the electronic devices 201. In at least some example embodiments, the interface element 802 may be automatically displayed by the common UI mode module 260 in response to the connection of the electronic devices 201 (i.e. at 402 of FIG. 4). For example, after the electronic devices 201 are connected, an icon or other interface element 802 may be displayed on one or both of the electronic devices 201 to indicate that the electronic devices 201 are able to enter a common UI mode with one another. A user may select one or both of these interface elements 802 to cause the electronic devices to enter a common UI mode.

Accordingly, in at least some example embodiments, the common UI mode module 260 associated with one or more of the electronic devices 201 is configured to determine whether the interface element 802 has been selected. In some example embodiments, if the interface element 802 on an electronic device 201 is selected, then the common UI mode module 260 may cause the electronic devices to enter the common UI mode.

In at least some example embodiments, the common UI mode module 260 is configured to cause the electronic devices to enter the common UI mode if both interface elements 802 are selected at the same time. That is, the common UI mode module 260 may require that an interface element 802 associated with both electronic devices 201 be selected at the same time (or approximately the same time, or within a predetermined amount of time) in order to cause the electronic devices 201 to enter the common UI mode; selection of an interface element 802 associated with one of the electronic devices 201 may be insufficient to cause the electronic devices 201 to enter the common UI mode unless such selection is also coupled with a simultaneous selection (or approximately simultaneous selection or selection within a predetermined amount of time) of the interface element 802 on the other electronic device.

In at least some example embodiments, the interface element selection described above may, when taken alone, cause the electronic devices 201 to enter a common UI mode. In other example embodiments, the interface element selection described above may only cause the electronic devices to enter the common UI mode if another predetermined trigger condition is satisfied. The other predetermined trigger condition may, in at least some example embodiments, be one of the other predetermined trigger conditions discussed herein.

Trigger Condition for Common UI Mode: Common Orientation

As noted in the discussion of FIG. 4 above, in at least some example embodiments, a predetermined trigger condition which may permit the electronic devices 201 to enter a common UI mode occurs when the orientation of the electronic devices 201 satisfies one or more predetermined orientation criteria. For example, in at least some example embodiments, the electronic devices 201 may be allowed to enter the common UI mode when they are oriented along a common plane.

Figure 9:
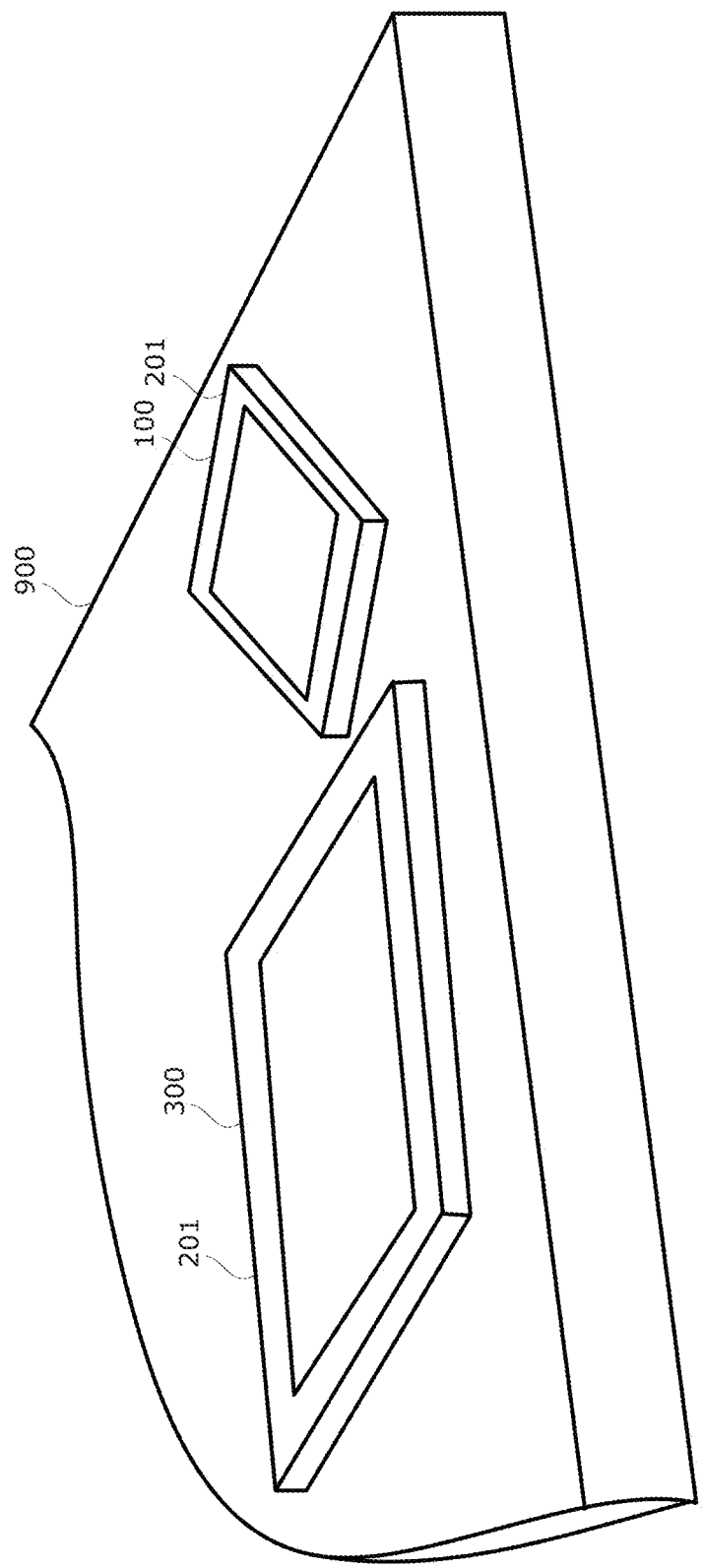
FIG. 9 is a perspective view of electronic devices in a table-top orientation in accordance with example embodiments of the present disclosure.

Referring now to FIG. 9, a perspective view of two electronic devices 201 which are oriented along a common plane is illustrated. In the example embodiment, two electronic devices 201 are placed upon a tabletop 900. That is, the electronic devices 201 are held in a substantially horizontal orientation.

The example embodiment illustrates two electronic devices 201, including a first electronic device and a second electronic device. In the example embodiment illustrated, the electronic devices 201 include a smartphone 100 and a tablet computer 300. However, in other example embodiments, other electronic devices 201 may be used. For example, in at least some example embodiments, the electronic devices 201 may be two smartphones 100 or two tablet computers 300.

Accordingly, in at least some example embodiments, the electronic devices 201 may be permitted to enter a common UI mode if the electronic devices 201 satisfy predetermined orientation criteria. For example, in some example embodiments, a pair of connected electronic devices (i.e. devices which have connected as described above with reference to 402 of FIG. 4) may be permitted to enter a common UI mode with one another if they are both held in a horizontal orientation (such as the orientation illustrated in FIG. 9).

While FIG. 9 represents one possible orientation of electronic devices 201 which may be used to trigger a common UI mode, in other example embodiments, other predetermined orientations may also be used.

The orientation of the electronic devices 201 may be determined using an orientation sensor 251 associated with the electronic devices. Example orientation sensors 251 are described in greater detail above with reference to FIG. 1. In at least some example embodiments, the orientation sensors 251 may be accelerometers and/or digital compasses.

Figure 10:
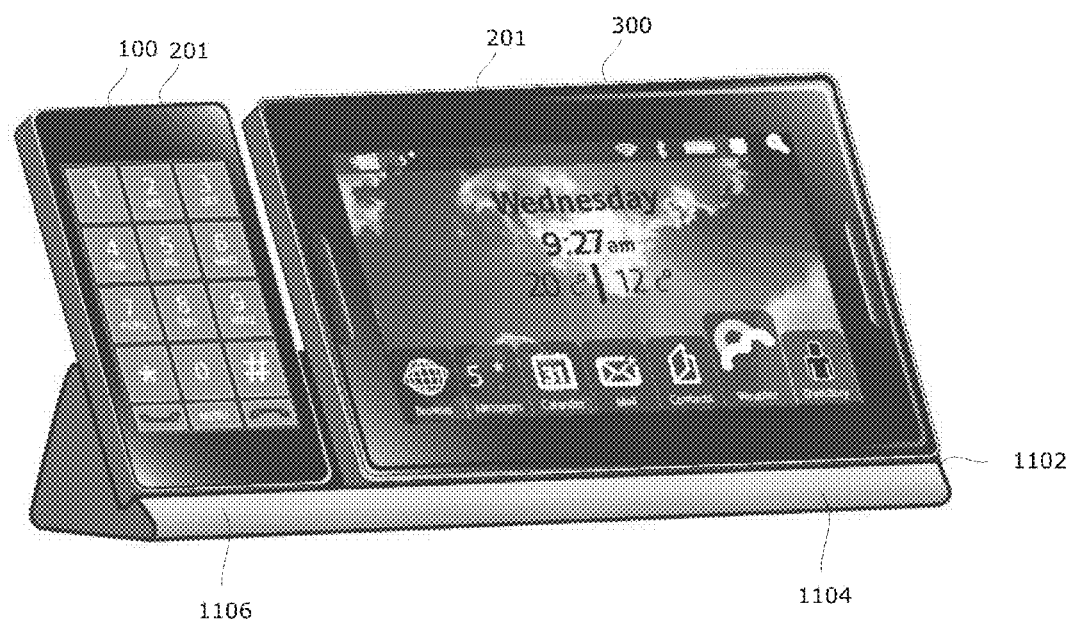
FIG. 10 is a perspective view of electronic devices held in a support accessory in accordance with example embodiments of the present disclosure.

Referring now to FIG. 10, another such orientation is illustrated. FIG. 10 illustrates a perspective view of two electronic devices 201. In the example embodiment illustrated, the electronic devices 201 include a smartphone 100 and a tablet computer 300. However, in other example embodiments, other electronic devices 201 may be used. For example, in at least some example embodiments, the electronic devices 201 may be two smartphones 100 or two tablet computers 300.

In the example embodiment of FIG. 10, two electronic devices 201 are held in a fixed orientation by a docking or support accessory 1102. In the example embodiment illustrated, the support accessory is a desktop phone support station which may be used to provide desktop-like phone capabilities using a smartphone 100 and a tablet computer 300.

The docking or support accessory 1102 may be an accessory which is configured to rest upon a table-top (or other horizontal support structure). In some example embodiments, the docking or support accessory may be configured to receive two or more electronic devices 201. The docking or support accessory may have supports 1104, 1106 which receive the electronic devices 201 and hold such electronic devices in predetermined orientations. More particularly, a first support 1104 may receive and hold a first electronic device 201 in a predetermined orientation and a second support 1106 may receive and hold a second electronic device 201 in a predetermined orientation. In the example embodiment illustrated, the first support 1104 and the second support 1106 hold the electronic devices 201 in a common orientation so that such electronic devices are oriented along a common plane.

In at least some example embodiments, when the electronic devices 201 are placed in the orientations associated with the docking or support accessory, the electronic devices 201 may be permitted to enter a common UI mode with one another.

Figure 11:
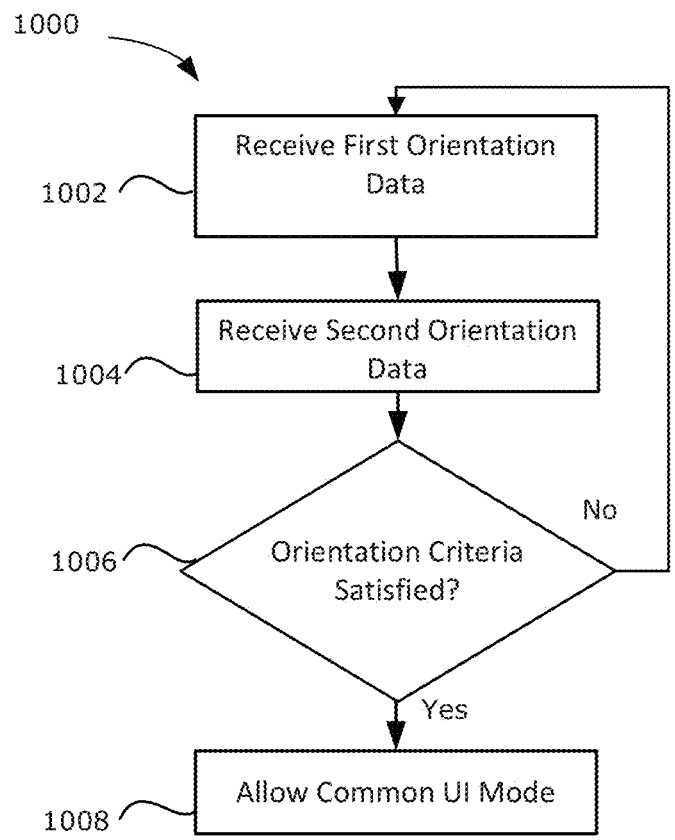
FIG. 11 is a flowchart of a method of allowing a common user interface mode in accordance with example embodiments of the present disclosure.

Referring now to FIG. 11, a flowchart of a method 1000 for allowing a common user interface mode on a first electronic device 201 and a second electronic device 201 is illustrated. The first electronic device and the second electronic device may be of the types described above with reference to FIGS. 1 to 3. For example, in at least some example embodiments, one or more of the first electronic device and/or the second electronic device may be a smartphone 100 such as the smartphone 100 illustrated in FIG. 2. In at least some example embodiments, one or more of the first electronic device and/or the second electronic device may be a tablet computer, such as the tablet computer 300 discussed above with reference to FIG. 3.

One or more of the electronic devices 201 may be configured to perform the method 1000 of FIG. 11. More particularly, the method 1000 may be performed by one of the electronic devices 201 in cooperation with another one of the electronic devices 201.

In at least some example embodiments, the processor 240 (FIG. 1) of one of the electronic device 201 (FIG. 1) is configured to perform the method 1000. More particularly, in at least some example embodiments, one or more application 225 (FIG. 1) or module stored in memory of the device 201 (FIG. 1) may be configured to perform the method 1000 of FIG. 11. One or more applications 225 (FIG. 1) may contain computer readable instructions which cause the processor 240 (FIG. 1) of the electronic device 201 (FIG. 1) to perform the method 1000. In at least some example embodiments, the common UI mode module 260 may be configured to perform the method 1000 of FIG. 11. More particularly, the common UI mode module 260 may include computer readable instructions which, when executed, cause the processor 240 (FIG. 1) to perform the method 1000 of FIG. 11.

The method 1000 of FIG. 11 may, in at least some example embodiments, be provided by other software applications or modules apart from those specifically discussed above; for example, the operating system 223 (FIG. 1). Similarly, any portion of the method 1000 of FIG. 11 may be performed by or rely on other applications 225 (FIG. 1) or modules which interface with common UI mode module 260 (FIG. 1).

Since the method 1000 involves the sharing of data between electronic devices 201, the method 1000 occurs after the electronic devices 201 have been connected together and are in communication with each other. For example, the method 1000 may occur following 402 of FIG. 4 in which the electronic devices are wirelessly connected to one another. The term "connected electronic devices" will be used herein to refer to electronic devices which are connected to one another and are in communication with each other.

At 1002, one of the connected electronic devices 201 (which will be referred to as a first electronic device) receives first orientation data from an orientation sensor 251 associated with the first electronic device 201. In at least some example embodiments, the first orientation data is accelerometer data which is received from an accelerometer. The first orientation data specifies, or may be used to determine, the absolute orientation of the first electronic device 201. That is, the first orientation data specifies, or may be used to determine, the orientation of the first electronic device 201 relative to gravity.

At 1004, the first electronic device 201 receives second orientation data from another one of the connected electronic devices 201 (which will be referred to as a second electronic device 201). The second orientation data is data obtained from an orientation sensor 251 associated with the second electronic device 201. In at least some example embodiments, the second orientation data is accelerometer data which is received from an accelerometer. The second orientation data specifies, or may be used to determine, the absolute orientation of the second electronic device 201. That is, the second orientation data specifies, or may be used to determine, the orientation of the second electronic device 201 relative to gravity.

Next, at 1006, the first orientation data and the second orientation data are used to determine whether the orientation of the first electronic device 201 and the orientation of the second electronic device 201 satisfy one or more predetermined orientation criterion.

In at least some example embodiments, determining whether the orientation of the first electronic device and the orientation of the second electronic device satisfy one or more predetermined orientation criterion includes determining if the first electronic device 201 and the second electronic device 201 are oriented along a common plane. In at least some example embodiments, if they are oriented along a common plane, then an orientation criterion may be satisfied.

In at least some example embodiments, determining if the first electronic device and the second electronic device satisfy one or more predetermined orientation criterion includes determining if the first electronic device 201 and the second electronic device 201 are both oriented in a table-top orientation. In at least some example embodiments, if they are oriented in a table-top orientation, then an orientation criterion may be satisfied.

In at least some example embodiments, determining if the first electronic device 201 and the second electronic device 201 satisfy one or more predetermined orientation criterion includes determining if the first electronic device 201 and the second electronic device 201 are oriented in a horizontal orientation. In at least some example embodiments, if they are oriented in a horizontal orientation, then an orientation criterion may be satisfied.

In at least some example embodiments, determining if the first electronic device 201 and the second electronic device 201 satisfy one or more predetermined orientation criterion includes determining if the first electronic device 201 and the second electronic device 201 are both oriented in an orientation associated with a docking or support accessory 1102 (FIG. 10) for the first electronic device and the second electronic device.

In at least some example embodiments, determining if the first electronic device 201 and the second electronic device 201 satisfy one or more predetermined orientation criterion includes determining if the first electronic device 201 is oriented in a first predetermined orientation and determining if the second electronic device 201 is oriented in a second predetermined orientation. In at least some example embodiments, the second predetermined orientation is different from the first predetermined orientation.

In at least some example embodiments, determining if the first electronic device 201 and the second electronic device 201 satisfy one or more predetermined orientation criterion includes determining if a relative angle between the first electronic device 201 and the second electronic device 201 satisfies predetermined orientation criterion. In at least some example embodiments, the predetermined orientation criterion requires that the relative angle between the electronic devices 201 be within a predetermined range. By way of example, in some example embodiments, the predetermined orientation criterion will be satisfied if the relative angle between the electronic devices 201 is in the range of thirty to forty degrees. The predetermined orientation criterion may specify other orientations or ranges in other example embodiments.

At 1008, if the orientation of the first electronic device and the orientation of the second electronic device satisfy the one or more predetermined orientation criterion, then the first electronic device and the second electronic device are allowed to enter a common user interface mode.

In at least some example embodiments, the nature of the common user interface mode may depend upon the one or more predetermined orientation criterion which are satisfied. For example, in at least some example embodiments, the nature of the common user interface mode may depend on the absolute orientation of the electronic devices. For example, a different common UI mode may be provided if the electronic devices 201 are in an orientation associated with a docking or support accessory 1102 (FIG. 10) than if the electronic devices are in a table-top orientation (FIG. 9). For example, in at least some example embodiments, when the electronic devices 201 are oriented in a table-top orientation (FIG. 9), the common UI mode may be an extended desktop mode in which a user interface generated by one of the electronic devices is spanned to include the display of both of the electronic devices. In at least some example embodiments, when the electronic devices 201 are oriented in an orientation associated with a docking or support accessory 1102 (FIG. 10) which is a desktop phone support station, then the common UI mode may be a desktop phone mode in which one of the electronic devices acts as a handset (e.g. by displaying digits) and the other of the electronic devices 201 acts as a display (e.g. by displaying additional information, such as applications, weather, called ID information, etc.).

In at least some example embodiments, if the one or more predetermined orientation criterion is satisfied, then the first electronic device and the second electronic device may enter the common UI mode with one another. That is, in response to determining that the orientation of the first electronic device and the second electronic device satisfy the predetermined orientation criterion, the electronic devices may enter the common user interface mode.

Figure 12:
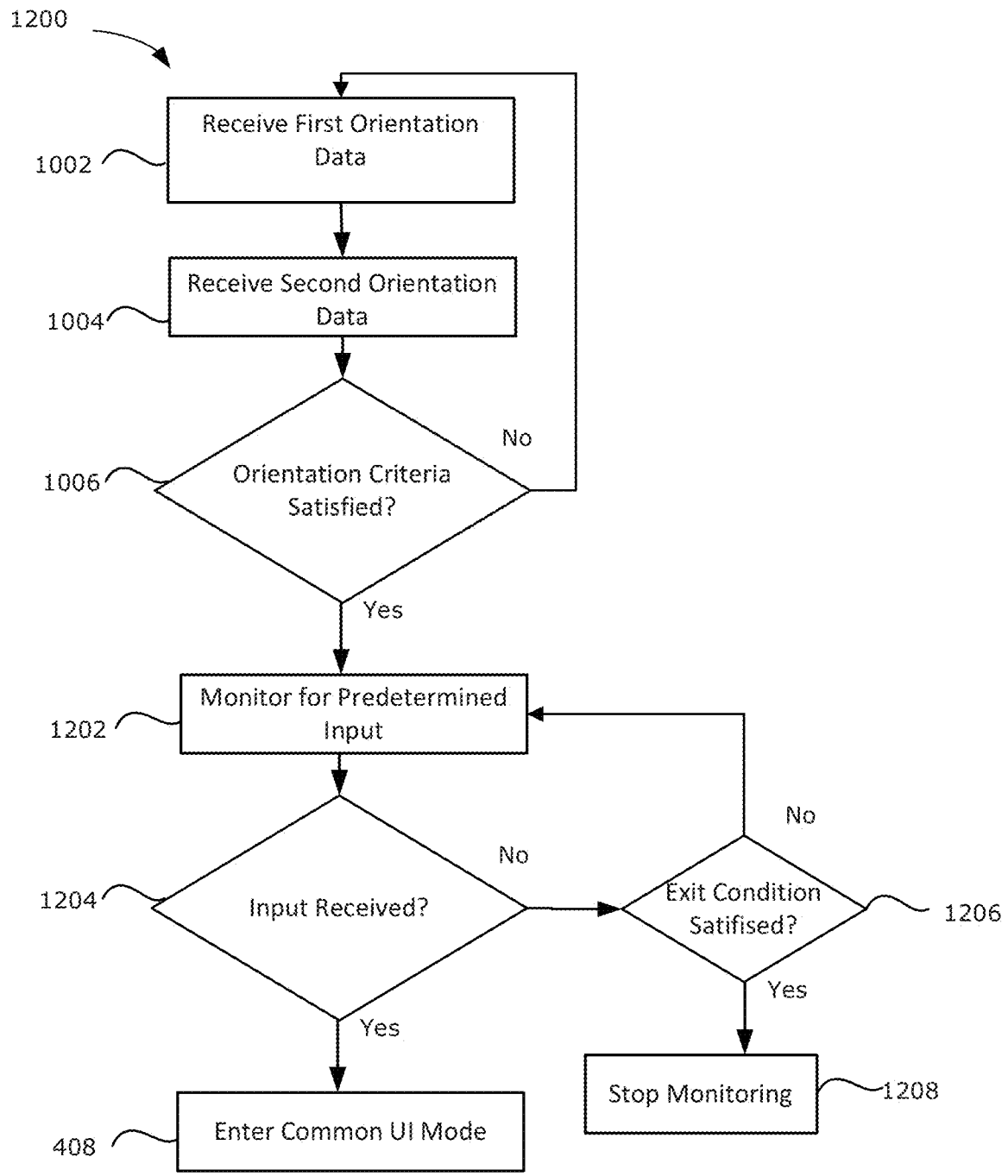
FIG. 12 is a flowchart of a method of entering a common user interface mode in accordance with example embodiments of the present disclosure.

In other example embodiments, in response to determining that the orientation of the first electronic device and the second electronic device satisfy the one or more predetermined orientation criterion, the electronic devices may not directly enter the common user interface mode. Instead, one or more additional predetermined trigger conditions must be satisfied before the electronic devices 201 will enter the common UI mode. Referring now to FIG. 12, one such example embodiment is illustrated.

In FIG. 12, a flowchart of a method 1200 for allowing a common user interface mode on a first electronic device and a second electronic device is illustrated. The first electronic device and the second electronic device may be of the types described above with reference to FIGS. 1 to 3. For example, in at least some example embodiments, one or more of the first electronic device and/or the second electronic device may be a smartphone 100 such as the smartphone 100 illustrated in FIG. 2. In at least some example embodiments, one or more of the first electronic device and/or the second electronic device may be a tablet computer, such as the tablet computer 300 discussed above with reference to FIG. 3.

One or more of the electronic devices 201 may be configured to perform the method 1200 of FIG. 12. More particularly, the method 1200 may be performed by one of the electronic devices 201 in cooperation with another one of the electronic devices 201.

In at least some example embodiments, the processor 240 (FIG. 1) of one of the electronic device 201 (FIG. 1) is configured to perform the method 1200. More particularly, in at least some example embodiments, one or more application 225 (FIG. 1) or module stored in memory of the device 201 (FIG. 1) may be configured to perform the method 1200 of FIG. 12. One or more applications 225 (FIG. 1) may contain computer readable instructions which cause the processor 240 (FIG. 1) of the electronic device 201 (FIG. 1) to perform the method 1200. In at least some example embodiments, the common UI mode module 260 may be configured to perform the method 1200 of FIG. 12. More particularly, the common UI mode module 260 may include computer readable instructions which, when executed, cause the processor 240 (FIG. 1) to perform the method 1200 of FIG. 12.

The method 1200 of FIG. 12 may, in at least some example embodiments, be provided by other software applications or modules apart from those specifically discussed above; for example, the operating system 223 (FIG. 1). Similarly, any portion of the method 1200 of FIG. 12 may be performed by or rely on other applications 225 (FIG. 1) or modules which interface with common UI mode module 260 (FIG. 1).

Since the method 1200 involves the sharing of data between electronic devices 201, the method 1200 occurs after the electronic devices 201 have been connected together and are in communication with each other. For example, the method 1200 may occur following 402 of FIG. 4 in which the electronic devices are wirelessly connected to one another.

The method 1200 of FIG. 12 includes features described above with reference to the method 1000 of FIG. 11. For example, at 1002 and 1004, a first electronic device may receive first orientation data and second orientation data. 1002 and 1004 are discussed in greater detail above with reference to FIG. 11.

At 1006, the first orientation data and the second orientation data are used to determine whether the orientation of the first electronic device 201 and the orientation of the second electronic device 201 satisfy one or more predetermined orientation criterion. 1006 is discussed in greater detail above with reference to FIG. 11.

If at 1006, it is determined that the one or more predetermined orientation criterion are satisfied, then the electronic devices 201 may be allowed to enter the common UI mode. In the example embodiment of FIG. 12, allowing the first electronic device 201 and the second electronic device 201 to enter a common user interface mode includes, at 1202, commencing to monitor for predetermined input authorizing the first electronic device 201 and the second electronic device 201 to enter a common user interface mode. In this example embodiment, when the one or more predetermined orientation criteria is satisfied, this may be treated as a trigger to begin monitoring for another input/trigger.

The predetermined input which one or more of the electronic devices 201 monitor for may, for example, be one of the predetermined trigger conditions described above with reference to FIGS. 5 to 8. Accordingly, in at least some example embodiments, the predetermined input includes a synchronous input received at both the first electronic device 201 and the second electronic device 201.

In at least some example embodiments, the predetermined input includes a bumping gesture in which the first electronic device 201 and the second electronic device 201 are bumped together. A bumping gesture and methods for detecting a bumping gesture are described above with reference to FIG. 5.

In at least some example embodiments, the predetermined input includes an NFC gesture, such as the type described above with reference to FIG. 6.

In at least some example embodiments, the predetermined input includes a swiping gesture across touchscreen displays 204 associated with the first electronic device 201 and the second electronic device 201. Such a swiping gesture is described in greater detail above with reference to FIG. 7.

In at least some example embodiments, the predetermined input includes the selection of predetermined interface elements 802 (FIG. 8) on both the first electronic device and the second electronic device. Such gestures are described above with reference to FIG. 8.

If the predetermined input authorizing the first electronic device and the second electronic device to enter a common user interface mode is received (as determined at 1204), then at 408, the electronic devices 201 enter the common user interface mode. That is, the first electronic device 201 and the second electronic device 201 enter the common user interface mode. 408 is discussed in greater detail above with reference to FIG. 4.

In at least some example embodiments, the method 1200 may include an exit condition which allows the method to stop monitoring for the predetermined input if a condition is satisfied. That is, in at least some example embodiments, if the exit condition is satisfied (at 1206), then the method 1200 may stop monitoring for the predetermined input (at 1208). That is, if the exit condition is satisfied, the electronic device 201 may be placed back into the state which it was in before the orientation criteria was satisfied at 1006. In at least some example embodiments, the exit condition is a timeout period. In such example embodiments, after the orientation criteria is satisfied (at 1006), the electronic device 201 may monitor for the predetermined input for a predetermined period of time. If the input is not received in this time, then the electronic device 201 may cease to monitor for the predetermined input.

In at least some example embodiments (not shown), after the first electronic device and second electronic device enter a common UI mode, orientation data from the first electronic device 201 and the second electronic device 201 may be used to determine whether to exit the common UI mode. For example, in at least some example embodiments, after allowing a first electronic device 201 and a second electronic device 201 to enter a common user interface mode, one or more of the electronic devices 201 may determine, from first orientation data and second orientation data, if the orientation of the first electronic device and the second electronic device satisfy second predetermined orientation criterion. If the orientation of the first electronic device and the second electronic device satisfy the second predetermined orientation criterion, then the common UI mode may be exited. For example, in at least some example embodiments, if the first electronic device and the second electronic device become oriented along different planes, then the common UI mode may be ended.

Determining Relative Orientation of Electronic Devices

Methods and electronic devices for determining the relative orientation of electronic devices 201 will now be discussed.

As noted above with respect to 406 of FIG. 4, in at least some example embodiments, the relative orientation of the electronic devices 201 may be determined relative to one another. In at least some example embodiments, determining the relative orientation of the electronic devices 201 may include identifying a side of the display 204 of the first electronic device 201 and a side of the display 204 of the second electronic device 201 which are closer together than any other sides of the display 204 of the first electronic device 201 are to any other sides of the display of the second electronic device 201. That is, the closest sides of the display 204 of the first electronic device 201 and the display 204 of the second electronic device 201 are identified.

In at least some example embodiments, determining the relative orientation of the electronic devices 201 may include determining transformation information regarding the electronic devices 201. The transformation information may, for example, specify a translation vector or matrix and/or a rotation matrix specifying the relative orientation of the electronic devices 201. A rotation is a circular movement of an object around a center of rotation. A translation involves moving every point a constant distance in a specified direction. Accordingly, the transformation information may represent the degree to which electronic devices 201 are offset from one another (i.e. translation information) and the degree to which electronic devices 201 are rotated relative to one another (i.e. rotation information).

In at least some example embodiments, the determination of the relative orientation of the electronic devices 201 may only be performed after a determination is made (e.g. in the manner described above with respect to FIGS. 9 to 12) that the electronic devices 201 are planar. That is, the determination of the relative orientation of the electronic devices 201 may only be determined after the electronic devices 201 determine that they are oriented along a common plane. In at least some example embodiments, where the electronic devices 201 are oriented along a common plane, it becomes easier to determine the relative orientation features described above. That is, where the electronic devices 201 are oriented along a common plane, it may be easier to identify the closest sides and/or transformation information representing the translation and rotation between the electronic device.

As noted in the discussion of FIG. 4 above, the specific method of determining the relative orientation of the electronic devices 201 may depend on the trigger conditions used to trigger the common UI mode. For example, in at least some example embodiments in which the trigger condition is a bumping together of the electronic devices 201, the relative orientation of the electronic devices 201 may be determined based on the data obtained from orientation sensors 251 associated with the first electronic device and/or the second electronic device.

Similarly, in at least some example embodiments in which the trigger condition which permits the common UI mode on the electronic devices 201 is a swiping gesture, the relative orientation of the electronic device may be determined based on the direction of the swiping gesture on each of the electronic devices.

Determining Relative Orientation with Camera

Figure 13:
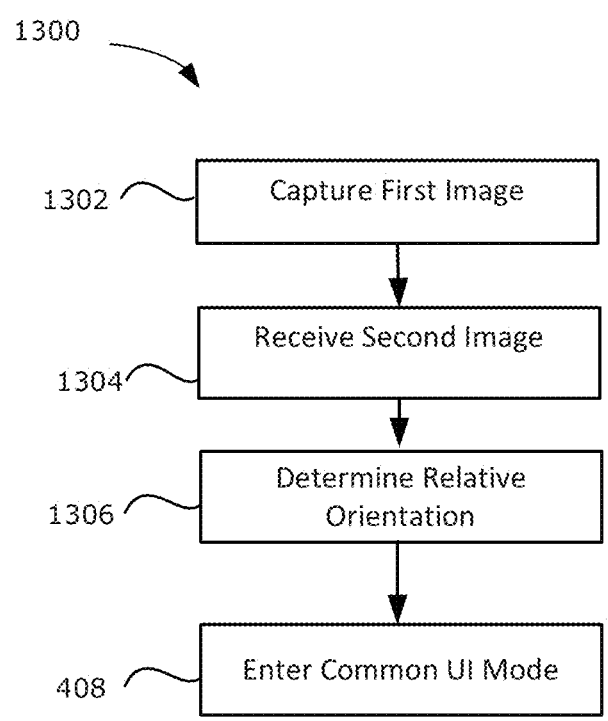
FIG. 13 is a flowchart of a method of entering a common user interface mode in accordance with example embodiments of the present disclosure.

Referring now to FIG. 13, in at least some example embodiments, cameras 253 associated with the electronic devices 201 may be used in order to determine the relative orientation of those electronic devices 201.

FIG. 13 illustrates a flowchart of a method 1300 for allowing a common user interface mode on a first electronic device and a second electronic device. The first electronic device and the second electronic device may be of the types described above with reference to FIGS. 1 to 3. For example, in at least some example embodiments, one or more of the first electronic device and/or the second electronic device may be a smartphone 100 such as the smartphone 100 illustrated in FIG. 2. In at least some example embodiments, one or more of the first electronic device and/or the second electronic device may be a tablet computer, such as the tablet computer 300 discussed above with reference to FIG. 3.

One or more of the electronic devices 201 may be configured to perform the method 1300 of FIG. 13. More particularly, the method 1300 may be performed by one of the electronic devices 201 in cooperation with another one of the electronic devices 201.

In at least some example embodiments, the processor 240 (FIG. 1) of one of the electronic device 201 (FIG. 1) is configured to perform the method 1300. More particularly, in at least some example embodiments, one or more application 225 (FIG. 1) or module stored in memory of the device 201 (FIG. 1) may be configured to perform the method 1300 of FIG. 13. One or more applications 225 (FIG. 1) may contain computer readable instructions which cause the processor 240 (FIG. 1) of the electronic device 201 (FIG. 1) to perform the method 1300. In at least some example embodiments, the common UI mode module 260 may be configured to perform the method 1300 of FIG. 13. More particularly, the common UI mode module 260 may include computer readable instructions which, when executed, cause the processor 240 (FIG. 1) to perform the method 1300 of FIG. 13.

The method 1300 of FIG. 13 may, in at least some example embodiments, be provided by other software applications or modules apart from those specifically discussed above; for example, the operating system 223 (FIG. 1). Similarly, any portion of the method 1300 of FIG. 13 may be performed by or rely on other applications 225 (FIG. 1) or modules which interface with common UI mode module 260 (FIG. 1).

Since the method 1300 involves the sharing of data between electronic devices 201, the method 1300 occurs after the electronic devices 201 have been connected together and are in communication with each other. For example, the method 1300 may occur following 402 of FIG. 4 in which the electronic devices are wirelessly connected to one another.

The method 1300 may be performed by one of the connected electronic devices 201 in cooperation with another one of the connected electronic devices. In the example embodiment illustrated, the electronic device 201 which performs the method is referred to as a first electronic device 201 and the electronic device 201 which cooperates with the first electronic device 201 to perform the method is referred to as a second electronic device. The first electronic device 201 and the second electronic device 201 each include a camera 253, which may be a front facing camera.

At 1302, a first image is captured on a first electronic device. The first image may be captured using the camera 253 of the first electronic device 201, which is, in at least some example embodiments, a front facing camera. The first image may be captured on the first electronic device 201 at the same time (or at approximately the same time) that a second image is captured on a second electronic device 201. The electronic devices 201 may coordinate the capture of images on their cameras 253 so that the images are captured at a common time. For example, one of the electronic devices 201 may trigger the capture of the images. The capture of the first image on the first electronic device 201 and the second image on the second electronic device 201 may be triggered in response to the occurrence of one or more predetermined trigger conditions (such as one or more of the trigger conditions discussed above with reference to FIGS. 5 to 12).

In at least some example embodiments, the capture of the first image on the first electronic device and the second image on the second electronic device may be triggered after it is determined that the first electronic device 201 and the second electronic device 201 are oriented along a common plane.

At 1304, the second image captured from the camera of the second electronic device is received at the first electronic device. The second image may be received, for example, via the short-range wireless communication subsystem 262.

Next, at 1306, the first image and the second image are analyzed by the first electronic device to determine the relative orientation of the first electronic device 201 and the second electronic device 201 based on the first image and the second image.

In at least some example embodiments, at 1306, the first electronic device may identify one or more common features in the first image and the second image and may determine the relative orientation of the first electronic device 201 and the second electronic device 201 based on the common features.

In at least some example embodiments, at 1306, the first electronic device 201 may calculate transformation information, such as a translation vector or matrix and/or a rotation matrix, specifying the relative orientation of the first electronic device 201 and the second electronic device 201.

In at least some example embodiments, at 1306, the first electronic device 201 may identify the nearest edges (i.e. sides) of the display 204 of the first electronic device 201 and the display 204 of the second electronic device 201.

Next, at 408, the first electronic device 201 may enter a common UI mode with the second electronic device 201. In the common UI mode, the display 204 associated with the first electronic device 201 and the display 204 associated with the second electronic device 201 may operate cooperatively. In the common UI mode, the orientation of a user interface displayed on the displays 204 is determined in accordance with the relative orientation determined at 1306.

For example, in at least some example embodiments, at 408 (or at 1306) a side of each of the first electronic device and the second electronic device may be selected as a shared side based on the first image and the second image. The user interface displayed on the displays 204 of the first electronic device 201 and the second electronic device 201 may be oriented based on the shared side. 408 is discussed in greater detail above with reference to FIG. 4.

In some environments, the electronic devices 201 may have difficulty in identifying common features in the first image captured on the first electronic device 201 and the second image captured on the second electronic device 201. In such example embodiments, one or more of the electronic devices 201 may be configured to project features which aid in the identification of common features.

For example, in at least some example embodiments, prior to capturing the first image and the second image, one or more of the electronic devices 201 may emit electromagnetic radiation from a side of that electronic device which is associated with the camera. For example, electromagnetic radiation may be emitted from an electromagnetic radiation source 257 (FIG. 1). In at least some such example embodiments, the electromagnetic radiation may be the common feature which is identified in the first image and the second image in order to determine the relative orientation of the electronic devices. That is, the electromagnetic radiation may be identified in the first image and the second image in order to determine the relative orientation of the electronic devices.

In at least some example embodiments, the electromagnetic radiation may be infrared. In some example embodiments, the cameras 253 on the first electronic device 201 and the second electronic device 201 may be configured to capture at least some electromagnetic radiation which is not in the visible spectrum and the electromagnetic radiation source 257 may be configured to emit electromagnetic radiation which is not in the visible spectrum but which is in a spectrum which is visible to the cameras 253. In at least some example embodiments, the electromagnetic radiation source 257 is configured to project a grid or other easily recognizable feature.

Furthermore, while the example embodiment described above describes an example in which the relative orientation of the electronic devices 201 is determined based on images received from a single camera 253 associated with each of the electronic devices 201, in other embodiments, at least one of the electronic devices 201 may include multiple cameras 253 and the orientation analysis described above may rely on images received from the multiple cameras 253 in order to determine the relative orientations. For example, in some example embodiments, the first electronic device 201 and the second electronic device 201 may each be equipped with a back facing camera 253 (i.e. a camera which is mounted on the side of the electronic device 201 which does not include the display 204) and the method 1300 of FIG. 13 may also be performed using the images obtained from the back facing cameras 253.

Similarly, in at least some example embodiments, one or more of the electronic devices 201 may be equipped with multiple front facing cameras 253. In at least some such example embodiments, images from both front facing cameras 253 may be used to determine the relative orientation of the electronic devices 201. For example, the method 1300 may be performed once using the image captured on a first one of the front facing cameras 253 of an electronic device 201 and again for the image captured on a second one of the front facing cameras 253 of the electronic device 201. In at least some example embodiments, the orientations determined using both of the front facing cameras may be averaged to determine the relative orientation of the electronic devices.

Furthermore, while the method 1300 described above referred to the use of images obtained from cameras 253 in order to determine the relative orientation, in other example embodiments, videos obtained from the cameras 253 may be used in order to determine the relative orientations. In at least some example embodiments, the use of two cameras on a single electronic device 201 may provide three dimensional (3D) information, such as 3D images. In some example embodiments, three dimensional information may be used to determine the relative orientation of electronic devices 201 with greater precision.

Determining Relative Orientation Based on Sound

Figure 14:
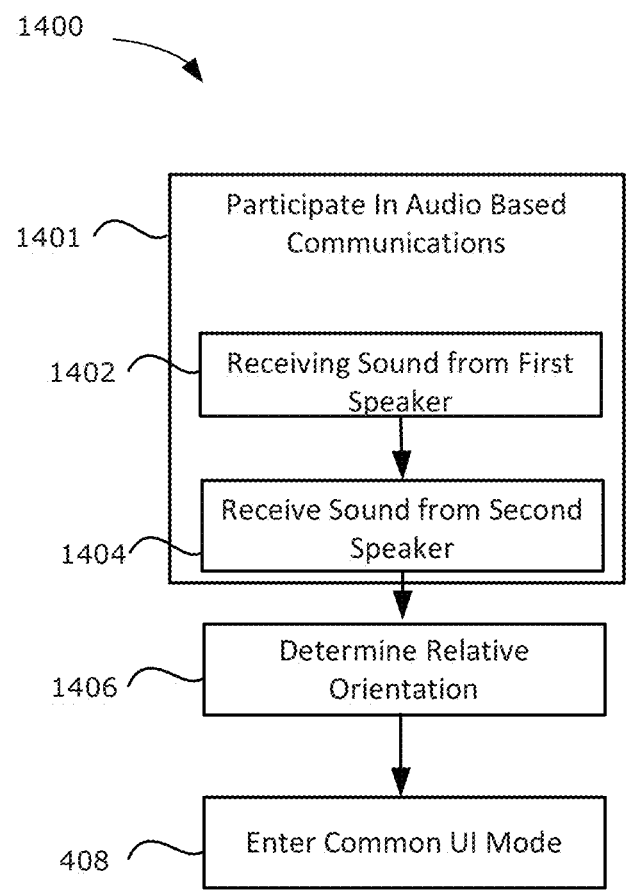
FIG. 14 is a flowchart of a method of entering a common user interface mode in accordance with example embodiments of the present disclosure.

Referring now to FIG. 14, in at least some example embodiments, two or more speakers 256 associated with an electronic device 201 and a microphone 258 associated with another electronic device may be used in order to determine the relative orientation of those electronic devices 201.

FIG. 14 illustrates a flowchart of a method 1400 for allowing a common user interface mode on a first electronic device 201 and a second electronic device 201. The first electronic device and the second electronic device may be of the types described above with reference to FIGS. 1 to 3. For example, in at least some example embodiments, one or more of the first electronic device 201 and/or the second electronic device 201 may be a smartphone 100 such as the smartphone 100 illustrated in FIG. 2. In at least some example embodiments, one or more of the first electronic device and/or the second electronic device may be a tablet computer, such as the tablet computer 300 discussed above with reference to FIG. 3.

One or more of the electronic devices 201 may be configured to perform the method 1400 of FIG. 14. More particularly, the method 1400 may be performed by one of the electronic devices 201 in cooperation with another one of the electronic devices 201.

In at least some example embodiments, the processor 240 (FIG. 1) of one of the electronic device 201 (FIG. 1) is configured to perform the method 1400. More particularly, in at least some example embodiments, one or more application 225 (FIG. 1) or module stored in memory of the device 201 (FIG. 1) may be configured to perform the method 1400 of FIG. 14. One or more applications 225 (FIG. 1) may contain computer readable instructions which cause the processor 240 (FIG. 1) of the electronic device 201 (FIG. 1) to perform the method 1400. In at least some example embodiments, the common UI mode module 260 may be configured to perform the method 1400 of FIG. 14. More particularly, the common UI mode module 260 may include computer readable instructions which, when executed, cause the processor 240 (FIG. 1) to perform the method 1400 of FIG. 14.

The method 1400 of FIG. 14 may, in at least some example embodiments, be provided by other software applications or modules apart from those specifically discussed above; for example, the operating system 223 (FIG. 1). Similarly, any portion of the method 1400 of FIG. 14 may be performed by or rely on other applications 225 (FIG. 1) or modules which interface with common UI mode module 260 (FIG. 1).

Since the method 1400 involves the sharing of data between electronic devices 201, the method 1400 occurs after the electronic devices 201 have been connected together and are in communication with each other. For example, the method 1400 may occur following 402 of FIG. 4 in which the electronic devices are wirelessly connected to one another.

The method 1400 may be performed by one of the connected electronic devices 201 in cooperation with another one of the connected electronic devices 201. In the example embodiment illustrated, the electronic device 201 which performs the method is referred to as a first electronic device 201 and the electronic device 201 which cooperates with the first electronic device 201 to perform the method 1400 is referred to as a second electronic device 201.

In order to determine the relative orientation of the electronic devices 201, the first electronic device 201 and the second electronic device 201 may engage in audio based communications with one another. Audio based communications occur when one of the electronic devices 201 emits a sound through a speaker associated with that electronic device which is received at the microphone of another of the electronic devices 201. As will be discussed in greater detail below, such audio based communications may be used to determine the relative orientation of electronic devices 201.

Accordingly, in at least some example embodiments, at 1401, the first electronic device 201 and the second electronic device 201 participate in audio based communications with one another. That is, the first electronic device 201 participates in audio based communications with the second electronic device 201 and the second electronic device 201 participates in electronic communications with the first electronic device.

In at least some example embodiments, one of the electronic devices 201 (which will be referred to as the first electronic device 201) includes two or more speakers 256 and another one of the electronic devices 201 (which will be referred to as a second electronic device 201) includes a microphone 258. The first electronic device 201 may sequentially emit sounds from its speakers 256. More particularly, the first electronic device 201 may emit a sound from a first speaker 256 and, when that sound is finished, may emit a sound from a second speaker 256. The sounds may, for example, be sounds which are short in duration such as, for example, short tones.

In at least some example embodiments, a sound emitted from the first speaker is received at the microphone 258 of the second electronic device 201 at 1402 and a sound emitted from the second speaker 256 is received at the microphone 258 of the second electronic device 201 at 1404.

From the received sounds, one of the electronic devices 201 determines an orientation (at 1406) of the first electronic device 201 relative to the second electronic device 201. In at least some example embodiments, the second electronic device 201 is configured to determine the relative orientation. In other example embodiments, the second electronic device 201 may provide information regarding the sounds to the first electronic device 201 and the first electronic device 201 is configured to determine the relative orientation.

In at least some example embodiments, the relative orientation of the electronic devices 201 may be determined based on the amplitude of the sounds received at the microphone of the second electronic device. In such example embodiments, the second electronic device may determine the amplitude of the received sounds and may determine the relative orientation of the electronic devices based on the amplitudes. For example, in at least some example embodiments the sounds are emitted from the first electronic device at common amplitudes. Differing amplitudes in the received sounds may be used to determine whether the first speaker 256 or the second speaker 256 of the first electronic device 201 is closest to the microphone 258 of the second electronic device 201. That is, one of the electronic devices may approximate the distance of the microphone 258 of the second electronic device to each of the speakers 256 of the first electronic device 201.

In at least some example embodiments, the relative orientation of the electronic devices 201 may be determined based on the elapsed time between the time at which the sound was emitted from the first speaker 256 of the first electronic device 201 and the time at which that sound was received at the microphone 258 of the second electronic device 256 and the elapsed time between the time at which the sound was emitted from the second speaker 256 of the first electronic device 201 and the time at which that sound was received at the microphone 258 of the second electronic device 201. That is, the relative orientation may be determined based on the elapsed time for the sounds to travel from each speaker 256 of the first electronic device to the microphone 258 of the second electronic device. One or more of the electronic devices 201 may be configured to determine these elapsed times.

In at least some example embodiments, the elapsed times may be determined by obtaining first timing information specifying a time at which the sound was emitted from the first speaker 256 and second time information specifying the time at which the sound was emitted from the second speaker 256. For example, the first electronic device 201 may be configured to provide this timing information to the second electronic device 201 via the short range wireless communication subsystems 262 of the electronic devices.

The second electronic device 201 may determine the times at which the sounds were received at the microphone 258. That is, the second electronic device 201 may determine the time at which the sound emitted from the first speaker 256 was received at the microphone 258 of the second electronic device 201 and the time at which the sound emitted from the second speaker 256 was received at the microphone 258 of the second electronic device 201.

Based on these times, one of the electronic devices 201 (such as the second electronic device 201) may determine the elapsed times. That is, an electronic device 201 may determine the elapsed time between when the sound was emitted by the first speaker 256 of the first electronic device 201 and when that sound was received at the microphone 258 of the second electronic device 201 based on the first timing information and the time at which the sound emitted from the first speaker was received at the microphone of the second electronic device. An electronic device may also determine the elapsed time between when the sound was emitted by the second speaker of the first electronic device and when that sound was received at the microphone of the second electronic device based on the second timing information and the time at which the sound emitted from the second speaker was received at the microphone of the second electronic device.

In at least some example embodiments, in order to ensure the accuracy of the elapsed times, the electronic devices 201 may share clock synchronization information with one another. The clock synchronization information specifies the degree to which the internal clocks on each of the electronic devices represent the same time.

In at least some example embodiments, at 1406, the second electronic device 201 may calculate transformation information, such as a translation vector or matrix and/or a rotation matrix, specifying the relative orientation of the first electronic device 201 and the second electronic device 201.

In at least some example embodiments, at 1406, the second electronic device 201 may identify the nearest edges (i.e. sides) of the display of the first electronic device 201 and the display of the second electronic device 201.

After the relative orientation of the electronic devices is determined, at 408, the second electronic device 201 may enter a common UI mode with the first electronic device 201. In the common UI mode, the display 204 associated with the first electronic device 201 and the display 204 associated with the second electronic device 201 may operate cooperatively. In the common UI mode, the orientation of a user interface displayed on the displays is determined in accordance with the relative orientation determined at 1406.

For example, in at least some example embodiments, at 408 a side of each of the first electronic device 201 and the second electronic device 201 may be selected as a shared side based on the first image and the second image. The user interface displayed on the displays of the first electronic device 201 and the second electronic device 201 may be oriented based on the shared side. 408 is discussed in greater detail above with reference to FIG. 4.

In at least some example embodiments, the method 1400 of FIG. 14 may only be performed if the electronic devices are oriented along a common plane. That is, one or more of the electronic devices may be configured to determine, from first orientation data from an orientation sensor associated with the first electronic device and second orientation data from an orientation sensor associated with the second electronic device, if the first electronic device and the second electronic device are oriented along a common plane. If the first electronic device and the second electronic device are oriented along a common plane, the electronic devices may be configured to cause the first electronic device to emit the sounds from the first speaker and the second speaker. That is, the method 1400 may be executed if it is determined that the electronic devices are oriented along a common plane.

Where both of the electronic devices 201 include two or more speakers 258 and a microphone 258, one of the electronic devices 201 may be selected to act as the first electronic device (i.e. the device playing the sound) and another of the electronic devices may be selected to act as the second electronic device (i.e. the device receiving the sound). In some example embodiments, the electronic devices may determine which electronic device will emit the sounds and which will receive the sounds based on one or more predetermined rules. For example, in at least some example embodiments, the electronic devices 201 are configured to determine which of the electronic devices has a larger speaker 256 separation and to select that electronic device 201 to act as the first electronic device (i.e. to emit sounds) and to select the other electronic device to act as the second electronic device (i.e. to receive sounds). Emitting the sounds through the speakers 256 of the electronic device 201 having the largest speaker 256 separation may facilitate the relative orientation analysis.

Furthermore, in at least some example embodiments, in order to ensure the reliability of the relative orientation analysis, the sounds emitted by the first speaker 256 and the second speaker 256 may have predetermined sound signatures. In such example embodiments, the second electronic device 201 may be configured to analyze received sounds to authenticate the sound signatures of received sounds. That is, the second electronic device may be configured to analyze the sounds to ensure that the sounds are of the type which are used to determine relative orientation of the electronic devices. Such an analysis may reduce the likelihood that ambient sounds may affect the analysis. The second electronic device may be configured to ignore sounds which are not authenticated (i.e. sounds which do not have the predetermined sound signature).

To further increase the accuracy of the method 1400, in at least some example embodiments, the electronic devices 201 are configured to ensure that the electronic devices 201 were not re-oriented between the time when the sound was emitted from the first speaker 256 of the first electronic device 201 and the time when the sound was emitted from the second speaker 256 of the first electronic device 201. Reorientations of the electronic devices during this time may affect the accuracy of the analysis. In at least some example embodiments, orientation sensors 251 associated with the electronic devices 201 may be monitored by the electronic devices 201 to ensure that no reorientation of the electronic devices 201 occurred during this time.

Determining the relative orientation using two speakers on one electronic device and a microphone on another electronic device 201 may result in some ambiguity in the determined relative orientation. That is, in some cases, the electronic devices 201 may be able to determine two or more possible relative orientations which the electronic devices 201 may be in, but may be unable to determine which of the two or more relative orientations the electronic devices are actually in. In at least some such example embodiments, the ambiguity may be resolved, in whole or in part, using one or more orientation sensors 251 associated with one or more of the electronic devices 201.

In other example embodiments, in order to resolve the ambiguity, a greater number of speakers and/or a greater number of microphones may be used. Accordingly, while the example embodiment described above discussed an example in which two speakers 256 on one electronic device 201 and a microphone 258 on another electronic device 201 are used in order to find the relative orientation of the electronic devices 201, in other example embodiments a different arrangement of speakers and/or microphones may be used in order to determine the relative orientation of the electronic devices 201. For example, in at least some example embodiments, the second electronic device may include two or more microphones 258. In such example embodiments, a sound emitted by a speaker on the first electronic device 201 may be received at each of the microphones 258 of the second electronic device 201. The use of two microphones on one electronic device 201 allows the distance from each of those microphones to the speaker on the first electronic device 201 to be determined (e.g. based on the elapsed time for the sound to reach each microphone or the loss in amplitudes in the sound at each microphone). Based on those distances, the relative orientation of the electronic devices 201 may be determined.

Similarly, in some example embodiments, the second electronic device may include three microphones. In such example embodiments, a sound emitted by a speaker of the first electronic device 201 may be received at each of the three microphones 258 of the second electronic device 201. This permits the distance from each of the microphones to the speaker of the first electronic device 201 to be determined (e.g. based on the elapsed time for the sound to reach each microphone or the loss in amplitudes in the sound at each microphone). Based on those distances, the relative orientation of the electronic devices 201 may be determined. In some example embodiments, three microphones and two speakers may be used in order to provide the orientation of the electronic devices 201 in a three dimensional space. For example, in some example embodiments, three microphones on one of the electronic devices receive sounds transmitted from two speakers on another one of the electronic devices. The relative orientation of the electronic devices in a three dimensional space may be determined based on the sounds received at each of the three microphones.

In some example embodiments in which the second electronic device 201 has two or more microphones 258, the first electronic device 201 may have two or more speakers 256. In such example embodiments, two or more of the speakers of the first electronic device may sequentially emit a sound (i.e. a first speaker may emit a first sound and, when finished, a second speaker may emit a second sound). The sounds may be received at each of the microphones 258 of the second electronic device 201 and distances between each speaker and microphone pair may be calculated and used to determine the relative orientation between the electronic devices.

Furthermore, in at least some example embodiments, each of the electronic devices 201 may be equipped with one or more speaker and one or more microphone. In such example embodiments, the electronic devices 201 may take turns emitting sounds. Each sound, once emitted, may be received at the other device's microphone. Distances between the speaker and microphone may be calculated and used to determine the relative orientation between the electronic devices. Accordingly, in at least some example embodiments, a second electronic device 201 may be configured to both receive a sound emitted from another electronic device and to emit a sound which is received at another electronic device.

In at least some of the example embodiments described above, sounds may be emitted on only one speaker at a time. That is, in order to determine the relative orientation of electronic devices 201, when sounds are emitted for the purpose of determining the relative orientation, they are emitted on only one speaker at a time. While one speaker is emitting a sound, any other speakers on that electronic device 201 and/or on another connected electronic device 201 are silent.

In at least some of the example embodiments described above, more than one speaker may emit a sound at a given time. In at least some such example embodiments, the sounds may be emitted with differing pitches or properties which permit speakers to separate the sounds from one another in order to associate a received sound with its source.

In at least some embodiments, at least some of the sounds which are emitted in the example embodiments described above may be sounds which are audible to the human ear. In at least some embodiments, at least some of the sounds which are emitted in the example embodiments described above may be sounds which are inaudible to the human ear. For example, in some example embodiments, the sounds may be ultrasonic sounds, which are sound having sound waves with a frequency above the upper limit of human hearing.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various example embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described example embodiments may be selected to create alternative embodiments included of a sub-combination of features which may not be explicitly described above. In addition, features from one or more of the above-described example embodiments may be selected and combined to create alternative embodiments included of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of allowing a common user interface mode on a first electronic device and a second electronic device, the method comprising:
   receiving first orientation data from an orientation sensor associated with the first electronic device;
   receiving, at the first electronic device, second orientation data from the second electronic device;
   determining, based on the first orientation data and the second orientation data, if the first electronic device and the second electronic device are resting on a common docking accessory and have a common orientation relative to the docking accessory,
   wherein the first orientation data and second orientation data comprises angular orientation and wherein the docking accessory receives the first electronic device and the second electronic device in a predetermined angular orientation; and
   in response to determining that the first electronic device and the second electronic device are resting on a common docking accessory and have a common orientation relative to the docking accessory, allowing the first electronic device and the second electronic device to automatically enter a common user interface mode, wherein determining if the first electronic device and the second electronic device have a common orientation relative to the docking accessory comprises determining if the first electronic device and the second electronic device are both oriented in fixed orientation relative to the docking accessory that satisfies the predetermined angular orientation.

2. The method of claim 1, wherein determining if the first electronic device and the second electronic device have a common orientation relative to the docking accessory comprises:
   determining if a relative angle between the first electronic device and the second electronic device satisfies a predetermined orientation criterion.

3. The method of claim 1, wherein allowing the first electronic device and the second electronic device to enter a common user interface mode comprises:
   commencing to monitor for predetermined input authorizing the first electronic device and the second electronic device to enter a common user interface mode; and
   in response to receiving the predetermined input authorizing the first electronic device and the second electronic device to enter a common user interface mode, entering the common user interface mode on the first electronic device and the second electronic device.

4. The method of claim 3, wherein the predetermined input comprises a synchronous input received at both the first electronic device and the second electronic device.

5. The method of claim 3, wherein the predetermined input comprises a bumping gesture in which the first electronic device and the second electronic device are bumped together.

6. The method of claim 3, wherein the predetermined input comprises a swiping gesture across touchscreen displays associated with the first electronic device and the second electronic device.

7. The method of claim 3, wherein the predetermined input comprises selection of a predetermined interface element on both the first electronic device and the second electronic device.

8. The method of claim 1, wherein the common user interface mode comprises an extended desktop mode in which a user interface generated by one of one of the first electronic device or the second electronic device is spanned to include the displays of both the first electronic device and the second electronic device.

9. The method of claim 1, wherein, in the common user interface mode, one of the first electronic device or the second electronic device acts as a primary device to control the display of the other of the first electronic device or the second electronic device.

10. The method of claim 1, wherein at least one of the first electronic device or the second electronic device is a smartphone.

11. The method of claim 1, wherein at least one of the first electronic device or the second electronic device is a tablet device.

12. The method of claim 1, further comprising, after allowing the first electronic device and the second electronic device to enter a common user interface mode:
   determining, from first orientation data and received second orientation data, if the orientation of the first electronic device and the second electronic device satisfy a first predetermined orientation criterion; and
   if the orientation of the first electronic device and the second electronic device satisfy the first predetermined orientation criterion, exiting the common user interface mode.

13. A first electronic device comprising:
an orientation sensor;
a communication subsystem for establishing wireless communications with a second electronic device;
a display;
a processor, the processor being configured to:
receive first orientation data from the orientation sensor associated with the first electronic device;
receive, at the first electronic device, second orientation data from the second electronic device;
determine, based on the first orientation data and the second orientation data, if the first electronic device and the second electronic device are resting on a common docking accessory and have a common orientation relative to the docking accessory,
wherein the first orientation data and second orientation data comprises angular orientation and wherein the docking accessory receives the first electronic device and the second electronic device in a predetermined angular orientation; and
in response to determining that the first electronic device and the second electronic device are resting on a common docking accessory and have a common orientation relative to the docking accessory, allow the first electronic device and the second electronic device to automatically enter a common user interface mode, wherein determining if the first electronic device and the second electronic device have a common orientation relative to the docking accessory comprises determining if the first electronic device and the second electronic device are both oriented in fixed orientation relative to the docking accessory that satisfies the predetermined angular orientation.

* * * * *